US009798478B2

(12) United States Patent
Choi et al.

(10) Patent No.: US 9,798,478 B2
(45) Date of Patent: Oct. 24, 2017

(54) NONVOLATILE MEMORY SYSTEM FOR CREATING AND UPDATING PROGRAM TIME STAMP AND OPERATING METHOD THEREOF

(71) Applicants: In-Hwan Choi, Hwaseong-si (KR); Byungjune Song, Suwon-si (KR)

(72) Inventors: In-Hwan Choi, Hwaseong-si (KR); Byungjune Song, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 84 days.

(21) Appl. No.: 14/692,641

(22) Filed: Apr. 21, 2015

(65) Prior Publication Data
US 2015/0370493 A1 Dec. 24, 2015

(30) Foreign Application Priority Data
Jun. 23, 2014 (KR) .................. 10-2014-0076530

(51) Int. Cl.
*G06F 3/06* (2006.01)
(52) U.S. Cl.
CPC .......... *G06F 3/0619* (2013.01); *G06F 3/0653* (2013.01); *G06F 3/0659* (2013.01); *G06F 3/0679* (2013.01); *G06F 3/0688* (2013.01); *G06F 2212/72* (2013.01); *G06F 2212/7207* (2013.01); *G06F 2212/7209* (2013.01)
(58) Field of Classification Search
CPC .... G06F 3/0619; G06F 3/0644; G06F 3/0653; G06F 3/0679; G06F 3/0659; G06F 3/0688; G06F 2212/72; G06F 2212/7201; G06F 2212/7204; G06F 2212/7205; G06F 2212/7206; G06F 2212/7207; G06F 2212/7209

USPC ........................................................ 711/103
See application file for complete search history.

(56) References Cited

U.S. PATENT DOCUMENTS

| 6,804,503 | B2 * | 10/2004 | Shohara ............ H04W 52/0216 340/7.32 |
|---|---|---|---|
| 7,325,090 | B2 | 1/2008 | Ronen |
| 7,639,927 | B2 | 12/2009 | Sutardja |
| 8,098,537 | B2 | 1/2012 | Mokhlesi |
| 8,261,136 | B2 | 9/2012 | D'Abreu et al. |
| 8,443,242 | B2 | 5/2013 | Weingarten et al. |
| 8,489,855 | B2 | 7/2013 | Schuette |
| 8,503,231 | B2 | 8/2013 | Kim et al. |

(Continued)

FOREIGN PATENT DOCUMENTS

WO    WO2012/158514 A1    11/2012

OTHER PUBLICATIONS

Kim, Yi-Reun, "Page-Differential Logging: An Efficient and DBMS-independent Approach for Storing Data into Flash Memory," KAIST Department of Computer Science, Nov. 2, 2009, CS/TR-2009-319.

*Primary Examiner* — Reginald Bragdon
*Assistant Examiner* — Aaron D Ho
(74) *Attorney, Agent, or Firm* — Volentine & Whitt, PLLC

(57) ABSTRACT

An operating method of a storage device and a nonvolatile memory device determine whether a nonvolatile memory device performs a program operation on at least one of a plurality of pages. Either a program time stamp table, managed with program elapsed times of the plurality of pages, or an update count of the program time stamp table is updated, based on the determination result.

12 Claims, 25 Drawing Sheets

(56) References Cited

U.S. PATENT DOCUMENTS

| | | |
|---|---|---|
| 8,533,384 B2 | 9/2013 | Olbrich et al. |
| 2005/0160189 A1* | 7/2005 | McNeill, Jr. .......... G06F 3/0616 710/1 |
| 2005/0240740 A1* | 10/2005 | Takeda ................ G06F 11/2066 711/162 |
| 2008/0183737 A1* | 7/2008 | Bhalotia ........... G06F 17/30613 |
| 2009/0161466 A1 | 6/2009 | Hamilton et al. |
| 2010/0318733 A1 | 12/2010 | Seo et al. |
| 2011/0066792 A1 | 3/2011 | Shaeffer et al. |
| 2012/0195821 A1 | 8/2012 | Sun et al. |
| 2012/0294104 A1* | 11/2012 | Mun ....................... G11C 11/56 365/218 |
| 2013/0238836 A1* | 9/2013 | Suzuki ............... G11C 16/3431 711/103 |
| 2013/0262753 A1 | 10/2013 | Prins et al. |
| 2014/0325123 A1* | 10/2014 | Higeta ................ G06F 12/0246 711/103 |

* cited by examiner

FIG. 6

BOT

| BOT Index | Block Number |
|---|---|
| 1 | BLK1 |
| 2 | BLK3 |
| 3 | BLK5 |
| 4 | BLK7 |
| 5 | BLK8 |
| 6 | - |
| 7 | - |
| 8 | - |
| ⋮ | |
| n | - |

FIG. 8 sPTS1

| Time Index (10ms) | Page Serial Number |
|---|---|
| 0.01 | 109986 |
| 0.02 | 109985 |
| 0.03 | FFFFFF |
| 0.04 | FFFFFF |
| 0.05 | FFFFFF |
| 0.06 | 109984 |
| 0.07 | 109983 |
| 0.08 | 109982 |
| 0.09 | 109981 | sPTS2

| Time Index (100ms) | Page Serial Number |
|---|---|
| 0.1 | 109980 |
| 0.2 | 109970 |
| 0.3 | 109960 |
| 0.4 | 109950 |
| 0.5 | 109940 |
| 0.6 | 109930 |
| 0.7 | 109920 |
| 0.8 | 109910 |
| 0.9 | 109900 | sPTS3

| Time Index (1s) | Page Serial Number |
|---|---|
| 1 | 109800 |
| 2 | 109700 |
| 3 | 109600 |
| 4 | 109500 |
| 5 | 109400 |
| 6 | 109300 |
| 7 | 109200 |
| 8 | 109100 |
| 9 | 109000 | sPTSk

| Time Index | Page Serial Number |
|---|---|
| $0.01 \times 10^{\wedge}K$ | 9 |
| $0.02 \times 10^{\wedge}K$ | 8 |
| $0.03 \times 10^{\wedge}K$ | 7 |
| $0.04 \times 10^{\wedge}K$ | FFFFFF |
| $0.05 \times 10^{\wedge}K$ | FFFFFF |
| $0.06 \times 10^{\wedge}K$ | 4 |
| $0.07 \times 10^{\wedge}K$ | 3 |
| $0.08 \times 10^{\wedge}K$ | 2 |
| $0.09 \times 10^{\wedge}K$ | 1 |

PTS

FIG. 22

PDT

| Time Index | PDT Index | Read Level Set |
|---|---|---|
| 0.01 ~ 0.5 | IND0 | V11 ~ V71 |
| 0.5 ~ 20 | IND1 | V12 ~ V72 |
| 20 ~ 1000 | IND2 | V13 ~ V73 |
| 1000 ~ | IND3 | V14 ~ V75 |

⋮

NONVOLATILE MEMORY SYSTEM FOR CREATING AND UPDATING PROGRAM TIME STAMP AND OPERATING METHOD THEREOF

CROSS-REFERENCE TO RELATED APPLICATIONS

A claim for priority under 35 U.S.C. §119 is made to Korean Patent Application No. 10-2014-0076530 filed Jun. 23, 2014, in the Korean Intellectual Property Office, the entire contents of which are hereby incorporated by reference.

BACKGROUND

The application described herein relates to a semiconductor memory, and more particularly, relates to a nonvolatile memory device and an operating method of a memory controller.

A semiconductor memory device is a storage device which is fabricated using semiconductors such as, but not limited to, silicon (Si), germanium (Ge), gallium arsenide (GaAs), and indium phosphide (InP). Semiconductor memory devices are classified into volatile memory devices and nonvolatile memory devices.

The volatile memory devices may lose contents stored therein at power-off. The volatile memory devices include the following: a static RAM (SRAM), a dynamic RAM (DRAM), and a synchronous DRAM (SDRAM). The nonvolatile memory devices may retain stored contents even at power-off. The nonvolatile memory devices include the following: a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

The flash memory is widely used due to advantages including the following: low noise, low power, and fast operating speed. For example, the flash memory is used as a storage medium of mobile systems, such as a smart phone, a tablet PC, and so on.

The flash memory contains semiconductor elements, such as a floating gate memory cell and a charge trap flash (CTF) memory cell. In particular, the CTF memory cell traps charge in a charge storage layer to vary a threshold voltage of the CTF memory cell and thereby stores data. Charge stored in the charge storage layer moves into a channel layer with the lapse of time, so its threshold voltage varies (i.e., its threshold voltage decreases). This phenomenon is called IVS (Initial Verify Shift). Data stored in the CTF memory cell may be lost due to the IVS. There is required a program management method to solve the above-described problem.

SUMMARY

One aspect of embodiments of the application is directed to provide an operating method of a storage device including a memory controller and a nonvolatile memory device. The operating method comprises determining whether the nonvolatile memory device performs a program operation on at least one of a plurality of pages. A program time stamp table, managed with program elapsed times of the plurality of pages, or an update count of the program time stamp table is updated based on the determination result.

In exemplary embodiments, the updating comprises, based on the determination result, either updating the program time stamp table while the nonvolatile memory device performs the program operation or updating the update count while the nonvolatile memory device does not perform the program operation.

In exemplary embodiments, the program time stamp table includes page serial numbers of some of the plurality of pages, depending on the program elapsed times. The page serial numbers denote a program order of the plurality of pages.

In exemplary embodiments, the determining is periodically performed.

In exemplary embodiments, the updating comprises updating the program time stamp table periodically while the nonvolatile memory device performs the program operation.

In exemplary embodiments, the updating comprises updating the update count periodically while the nonvolatile memory device does not perform the program operation.

In exemplary embodiments, the updating comprises determining whether the update count exists, while the nonvolatile memory device performs the program operation. As a consequence of determining that the update count exists, the program time stamp table is updated in accordance with the update count and the update count is reset.

In exemplary embodiments, the updating further comprises, as a consequence of determining that the update count does not exist, determining whether an elapsed time from a point in time when the program time stamp table is updated is over a reference time. The program time stamp table is updated when the elapsed time from the point in time when the program time stamp table is updated is over the reference time.

In exemplary embodiments, the updating comprises, as a consequence of determining that the nonvolatile memory device does not perform the program operation, determining whether an elapsed time from a point in time when the program time stamp table is updated is over a reference time. The update count is updated when the elapsed time from the point in time when the program time stamp table is updated is over the reference time.

In exemplary embodiments, the updating comprises updating the program time stamp table with the update count when the update count is over a threshold value.

In exemplary embodiments, the operating method further comprises receiving a read request and a logical address from an external device; generating a page serial number of a page corresponding to the received logical address; detecting a program elapsed time of the page corresponding to the received logical address, depending on the page serial number thus generated and the program time stamp table; and adjusting levels of read voltages of the nonvolatile memory device, depending on the program elapsed time thus detected.

In exemplary embodiments, the detecting comprises determining whether the update count exists; and as a consequence of determining that the update count exists, compensating the program elapsed time for a time difference with the update count.

Another aspect of embodiments of the application is directed to provide a nonvolatile memory system comprising a nonvolatile memory device including a plurality of pages; and a memory controller configured to manage page serial numbers of some of the plurality of pages in the form of a program time stamp table, depending on program elapsed times of the plurality of pages. The memory controller is configured to determine whether the nonvolatile memory device performs a program operation on at least one of the plurality of pages, and update either the program time stamp table or an update count of the program time stamp table, based on the determination result.

In exemplary embodiments, the memory controller updates the program time stamp table while the nonvolatile memory device performs the program operation. The memory controller updates the update count while the nonvolatile memory device does not perform the program operation.

In exemplary embodiments, the program time stamp table is managed in logarithmic scale. The program time stamp table comprises a plurality of sub tables of which the update periods are different from each other.

In exemplary embodiments, the update count comprises a plurality of sub update counts respectively corresponding to the plurality of sub tables. The memory controller updates the plurality of sub update counts, depending on the update periods of the plurality of sub tables.

In exemplary embodiments, the memory controller updates the program time stamp table when the update count is over a threshold value.

In exemplary embodiments, the memory controller is configured to receive a read request and a logical address from an external device, generate a page serial number of a page corresponding to the received logical address, detect a program elapsed time of the page corresponding to the received logical address, depending on the generated page serial number and the program time stamp table, adjust levels of read voltages of the nonvolatile memory device, depending on the program elapsed time thus detected, and read the page corresponding to the logical address, depending on the plurality of read voltages thus adjusted.

In exemplary embodiments, when the update count exists, the memory controller is further configured to compensate for the program elapsed time on the basis of the update count and adjust levels of a plurality of read voltages of the nonvolatile memory device using the compensated program elapsed time.

In exemplary embodiments, the nonvolatile memory system is one of an SD card, an MMC card, a USB flash memory driver, and an eMMC card.

Another aspect of embodiments of the application is directed to provide an operating method of a memory controller. The method includes receiving an address from a data requesting device; determining the amount of time that has elapsed since a page corresponding to the received address was stored in a nonvolatile memory; and adjusting the amount of a read voltage of the nonvolatile memory device in accordance with the elapsed time.

In exemplary embodiments, the method further includes storing a lowest update-time index value and an update-time index value corresponding to the page in a sub table of a program time stamp (PTS) table and maintaining an update count corresponding to the PTS sub table. The elapsed time is determined from the update-time index value corresponding to the page, the update count, and the lowest update-time index value.

In exemplary embodiments, the update-time index value corresponding to the page is updated within the PTS table only when a program operation of the nonvolatile memory is conducted.

In exemplary embodiments, the update-time index value corresponding to the page is updated within the PTS table when an amount of time greater than the lowest update-time index value stored in the PTS sub table has elapsed from the last time the update-time index value corresponding to the page was updated within the PTS table.

In exemplary embodiments, the update count stored in the PTS sub table is incremented when both: a program operation of the nonvolatile memory is not conducted and the amount of time that has elapsed from the time the update count stored in the PTS sub table was last updated exceeds the value of time identified by the lowest update-time index value stored in the PTS sub table.

In exemplary embodiments, the elapsed time is determined as the update-time index value corresponding to the page summed with the product of the update count and the lowest update-time index value stored in the PTS sub table.

BRIEF DESCRIPTION OF THE FIGURES

Embodiments of the application will be described below in more detail with reference to the accompanying drawings. The embodiments of the application may, however, be embodied in different forms and should not be construed as limited to the embodiments set forth herein. Rather, these embodiments are provided so that this disclosure will be thorough and complete, and will fully convey the scope of the application to those skilled in the art. Like numbers refer to like elements throughout.

FIGS. 6 and 7 are diagrams for describing a block order table shown in FIG. 1;

FIGS. 8 through 10 are diagrams for describing a program time stamp table shown in FIG. 1;

FIGS. 18 through 22 are diagrams for describing an operating method shown in FIG. 17;

DETAILED DESCRIPTION

Figure 1:
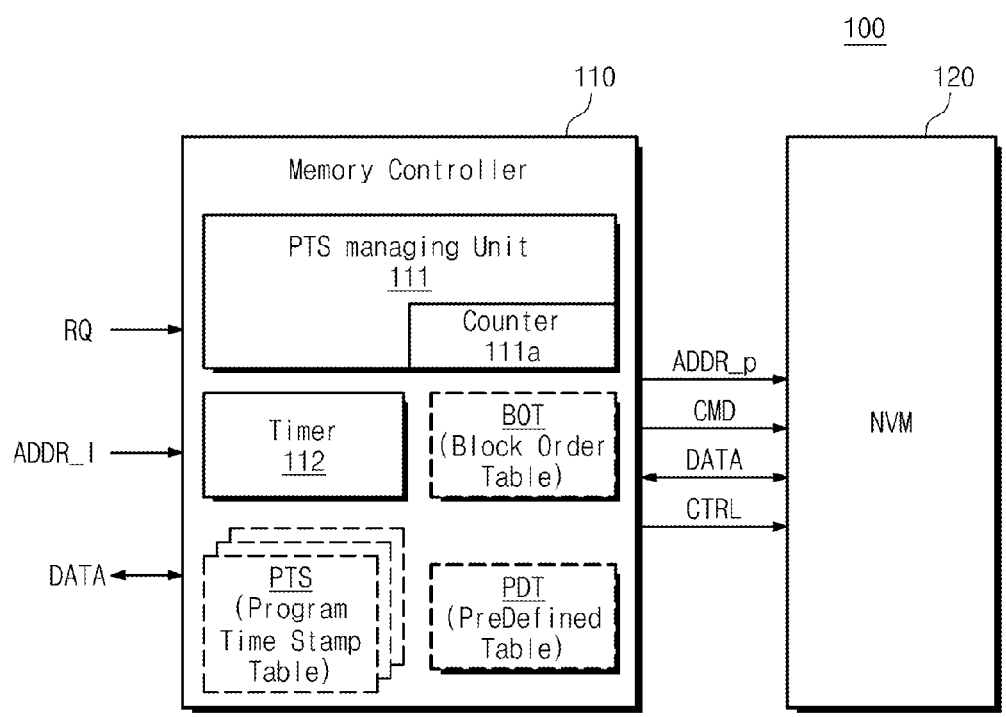
FIG. 1 is a block diagram schematically illustrating a nonvolatile memory system according to an embodiment of the application.

Detailed example embodiments of the application are disclosed herein. However, specific structural and functional details disclosed herein are merely representative for purposes of describing example embodiments of the application. Example embodiments of the application may, however, be embodied in many alternate forms and should not be construed as limited to only the embodiments set forth herein.

Accordingly, while example embodiments of the application are capable of various modifications and alternative forms, embodiments thereof are shown by way of example in the drawings and will herein be described in detail. It should be understood, however, that there is no intent to limit example embodiments of the application to the particular forms disclosed, but to the contrary, example embodiments of the application are to cover all modifications, equivalents, and alternatives falling within the scope of example embodiments of the application. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the application. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the application. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A memory controller according to an embodiment of the application may manage program elapsed times of pages on the basis of a program time stamp table. The memory controller may update the program time stamp table when a nonvolatile memory device is being used. The memory controller updates an update count when the nonvolatile memory device is not used. Afterwards, when the nonvolatile memory device performs a program operation, the memory controller updates the program time stamp table on the basis of the update count, thereby reducing overhead due to the program time stamp table. This may mean that a nonvolatile memory system and an operating method of the memory controller are improved.

FIG. 1 is a block diagram schematically illustrating a nonvolatile memory system according to an embodiment of the application. Referring to FIG. 1, a nonvolatile memory system 100 contains a memory controller 110 and a nonvolatile memory device 120.

In exemplary embodiments, each of the nonvolatile memory device 120 and the memory controller 110 may be provided with the form of a chip, a package, or a module. Alternatively, the memory controller 110 and the nonvolatile memory device 120 may be packed according to any of a variety of different packaging technologies to constitute a nonvolatile memory system. Examples of such packaging technologies may include the following: Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

The memory controller 110 receives a request RQ and a logical address ADDR_I from an external device (e.g., an application processor (AP) or a host). In response to the received signals, the memory controller 110 transmits data to the external device or writes data received from the external device in the nonvolatile memory device 120. In exemplary embodiments, the logical address ADDR_l may indicate a location of a data unit that is defined by the external device.

The memory controller 110 sends a physical address ADDR_p, a command CMD, and a control signal CTRL to the nonvolatile memory device 120 to write data at the nonvolatile memory device 120 or to read data written in the nonvolatile memory device 120. In exemplary embodiments, the memory controller 110 converts the logical address ADDR_l received from an external device into a physical address ADDR_p. The physical address ADDR_p indicates physical locations of a plurality of pages in the nonvolatile memory device 120. For example, the physical address ADDR_p may include information such as a physical block number PBN and a physical page number PPN.

In response to signals from the memory controller 110, the nonvolatile memory device 120 may store data provided from the memory controller or send the stored data to the memory controller 110. The nonvolatile memory device 120 is a NAND flash memory device, for example. The nonvolatile memory device 120 includes a plurality of memory blocks, each of which is formed of a plurality of pages. The nonvolatile memory device 120 may include charge trap flash (CTF) memory cells. However, the application is not limited thereto.

The CTF memory cells of the nonvolatile memory device 120 have the physical characteristic that their threshold voltages vary as time elapses after program operation on the memory cells. The physical characteristic is referred to as Initial Verify Shift (IVS). Since threshold voltages of memory cells vary as time elapses due to the IVS, read data may include a plurality of errors after certain time elapses after program operation. If the errors are not correctable by an error correction code (ECC) circuit, a separate error correction operation is required to correct the errors. The separate error correction operation may be carried out with software, thereby increasing time required to correct errors.

To solve the above-described problem, the memory controller 110 may manage program times of memory cells (or, pages or memory blocks) of the nonvolatile memory device 120.

The memory controller 110 includes a program time stamp table (PTS) managing unit 111, a timer 112, a block order table BOT, a program time stamp table PTS, and a PreDefined table PDT.

The program time stamp table managing unit 111 (hereinafter, referred to as PTS managing unit) may manage program times of pages of the nonvolatile memory device 120. For example, when data is written at the nonvolatile memory device 120, the PTS managing unit 111 writes a page serial number PSN of a page, at which data is to be written, at the program time stamp table PTS and then updates the program time stamp table PTS periodically. Alternatively, the PTS managing unit 111 updates the program time stamp table PTS, depending on a specific condition. For example, the specific condition may include the following: a case where the nonvolatile memory device 120 performs a program operation or a case where a time elapsing after the program time stamp table PTS is updated is over a predetermined time.

While the nonvolatile memory device 120 performs a program operation, the PTS managing unit 111 may update the program time stamp table PTS. That is, when the nonvolatile memory device 120 does not perform a program operation, the PTS managing unit 111 will not update the program time stamp table PTS.

If a predetermined time elapses under the condition that the nonvolatile memory device does not conduct a program operation, the PTS managing unit 111 may renew an update count. In exemplary embodiments, an update count may be updated by a counter 111a included in the PTS managing unit 111. If the nonvolatile memory device 110 performs a program operation, the PTS managing unit 111 updates the program time stamp table PTS, depending on the renewed update count. Below, an operation where the PTS managing unit 111 updates the program time stamp table PTS will be more fully described with reference to accompanying drawings.

The timer 112 may count a clock (e.g., an operating clock or a reference clock) to generate a current time. In exemplary embodiments, the clock may be provided from an external device or may be a clock generated in the memory controller 110. In exemplary embodiments, the current time may be an absolute time. Alternatively, the current time may be a relative time on the basis of a reference time. In exemplary embodiments, an update count changed by a counter 111a may be calculated on the basis of the current time thus generated. Although not shown, the counter 111a is included in the timer 112, and the timer 112 updates the update count.

The block order table BOT may include information on an allocation order of memory blocks of the nonvolatile memory device 120. For example, the memory controller 110 may convert a logical address ADDR_l from the external device into a physical address ADDR_p of the nonvolatile memory device 120. At this time, the memory controller 110 sequentially allocates the memory blocks of the nonvolatile memory device 120. In exemplary embodiments, the PTS managing unit 111 may generate a page serial number PSN, depending on the block order table BOT. The block order table BOT and the page serial number PSN will be described in detail with reference to FIGS. 6 and 7.

The program time stamp table PTS includes information on program elapsed times of the pages of the nonvolatile memory device 120. For example, the program time stamp table PTS may be managed and updated by the PTS managing unit 111. The program time stamp table PTS may be managed, for example, in logarithmic scale. The PTS managing unit 111 manages program elapsed times of the pages, depending on the program time stamp table. The program time stamp table will be more fully described later with reference to accompanying drawings.

The predefined table PDT includes program elapsed times and index information. For example, the predefined table PDT contains program elapsed time intervals and index information. The program elapsed time interval denotes a program elapsed time range. PDT index information denotes information on a read voltage set. For example, a first elapsed time interval may indicate 0~0.5 seconds. At this time, PDT index information on the first elapsed time interval is '1', and PDT index information on a second elapsed time interval is '2'. If a program elapsed time of a selected page (i.e., a page to be read) is included in the first elapsed time interval, the memory controller 110 may control the nonvolatile memory device 120 such that the nonvolatile memory device 120 performs a read operation on the basis of a read voltage set corresponding to the PDT index information of '1'.

Figure 2:
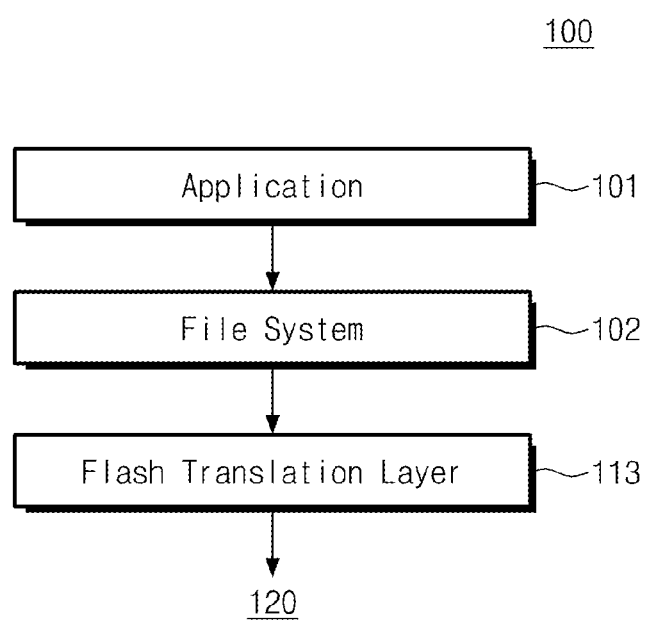
FIG. 2 is a block diagram schematically illustrating the software hierarchy of a nonvolatile memory system shown in FIG. 1.

FIG. 2 is a block diagram schematically illustrating software layers of a nonvolatile memory system shown in FIG. 1. Referring to FIGS. 1 and 2, an application 101 denotes a variety of application programs run on an external device. For example, the application 101 may include a document editor, a video player, a web browser, etc. Data that is generated by a run of the application 101 or is needed to run the application 101 may be stored in a nonvolatile memory device 120.

When files or data is stored at the nonvolatile memory device 120, a file system 102 may organize the files or data thus stored. For example, the file system 102 may provide a logical address ADDR_l to a memory controller 110 according to a write request. The file system 102 may have various formats according to an operating system OS of the external device. In exemplary embodiments, the file system 102 may include the following: File Allocation Table (FAT), FAT32, NT File System (NTFS), Hierarchical File System (HFS), Journaled File System2 (JSF2), XFS, On-Disk Structure-5 (ODS-5), UDF, ZFS, Unix File System (UFS), ext2, ext3, ext4, ReiserFS, Reiser4, ISO 9660, Gnome VFS, BFS, WinFS, etc. For example, the application 101 and the file system 102 may be run by the external device (e.g., a host or an application processor)

A flash translation layer (hereinafter, referred to as FTL) 113 provides an interface between the external device and the nonvolatile memory device such that the nonvolatile memory device 120 is efficiently utilized. The FTL 113 may allocate memory blocks of the nonvolatile memory device 120 as a write block and manage memory blocks allocated as write blocks. For example, the FTL 113 receives a logical address ADDR_l generated by the file system 102 and converts it to a physical address ADDR_p usable in the nonvolatile memory device 120. The FTL 113 determines whether a memory block allocated as a write block includes a writable page(s). The FTL 113 allocates a new free block as a write block when the memory block allocated to a write block does not include a writable page. That is, the FTL 113 may sequentially allocate write blocks. The FTL 113 may manage the address conversion using a mapping table. In exemplary embodiments, the FTL 113 may be driven by the memory controller 110.

In exemplary embodiments, the FTL 113 may perform operations such as, but not limited to, garbage collection and wear-leveling management. The FTL 113 may make free blocks or allocate write blocks, depending on such operations.

Figure 3:
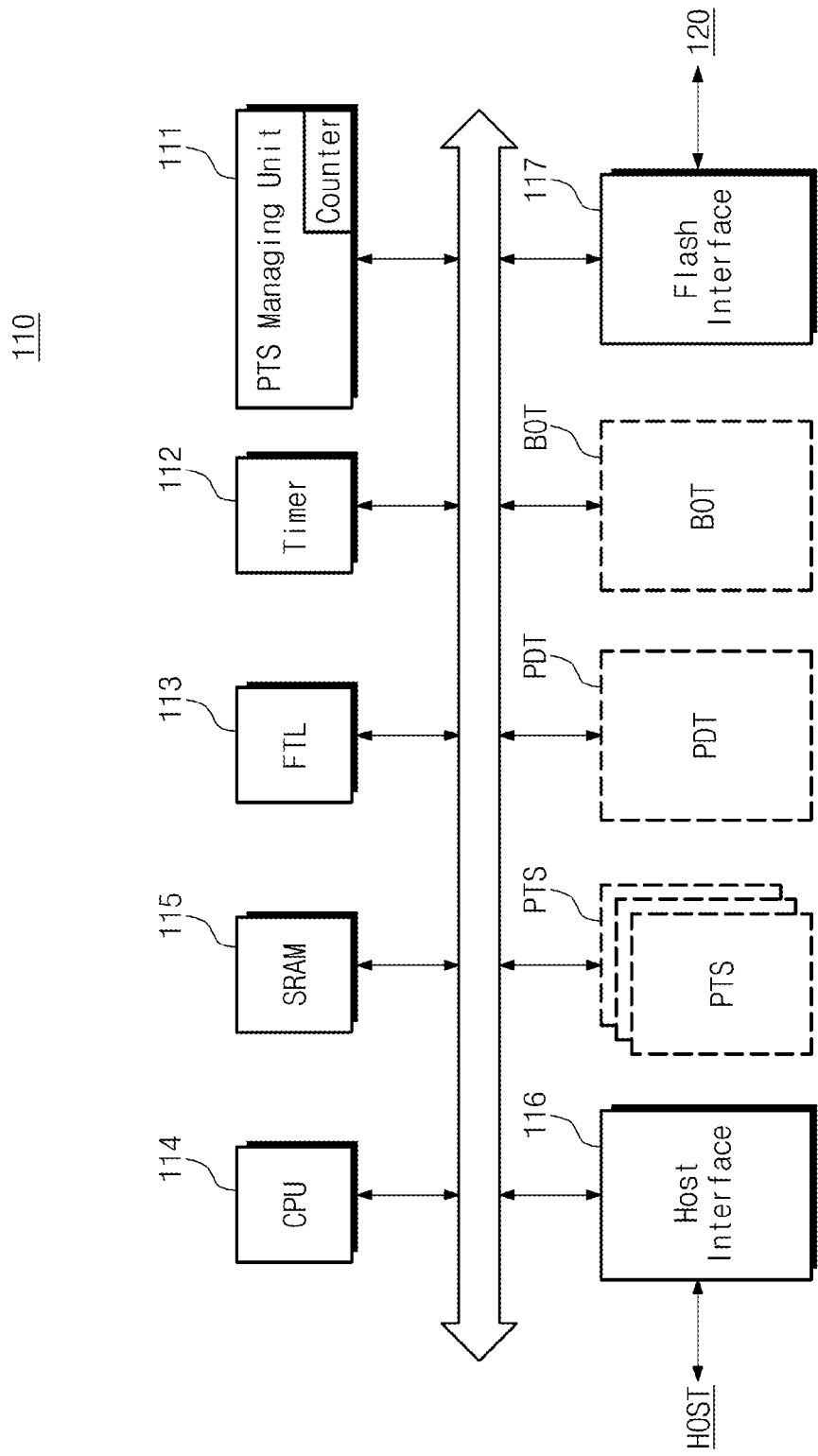
FIG. 3 is a block diagram schematically illustrating a memory controller shown in FIG. 1.

FIG. 3 is a block diagram schematically illustrating a memory controller shown in FIG. 1. Referring to FIGS. 1 and 3, a memory controller 110 includes a PTS managing unit 111, a timer 112, a FTL 113, a central processing unit (CPU) 114, an SRAM 115, a host interface 116, a flash interface 117, a block order table BOT, a program time stamp table PTS, and a predefined table PDT.

The constituent elements 111 to 113 and the tables BOT, PTS, and PDT are described with reference to FIGS. 1 and 2, and a description thereof is thus omitted here.

The CPU 114 may control an overall operation of the memory controller 110. The SRAM 115 may be used as a buffer memory, a working memory, or a main memory of the memory controller 110.

The memory controller 110 may communicate with an external device (e.g., a host) via the host interface 116. For example, the host interface 116 may be implemented with at least one of various interfaces such as, but not limited to, an Universal Serial Bus (USB), a multimedia card (MMC), an embedded MMC (eMMC), a Peripheral Component Interconnection (PCI), a PCI-Express, an Advanced Technology Attachment (ATA), Serial-ATA, Parallel-ATA, a small computer small interface (SCSI), an enhanced small disk interface (ESDI), an Integrated Drive Electronics (IDE), a Mobile Industry Processor Interface (MIPI), a Nonvolatile memory express (NVMe), an Universal Flash Storage (UFS), etc. The memory controller 110 communicates with the nonvolatile memory device 120 via the flash interface 117. For example, the flash interface 117 may include NAND interface.

The PTS managing unit 111 and the FTL 113 may be implemented by a software layer and are driven by the CPU 114. The PTS managing unit 111 and the FTL 113 may be stored at a separate storage medium (e.g., ROM or meta area of the nonvolatile memory device 120) in the form of firmware and may be driven by the CPU 114. The block order table BOT, the program time stamp table PTS, and the predefined table PDT are stored at the SRAM 115 and are updated by the PTS managing unit 111 and the CPU 114 driving the FTL 113. The block order table BOT, the program time stamp table PTS, and the predefined table PDT stored at the SRAM 115 may be periodically flushed into the meta area of the nonvolatile memory device 120. Alternatively, the PTS managing unit 111, the FTL 113, the block order table BOT, the program time stamp table PTS, and the predefined table PDT are stored at the SRAM 115 and are driven or managed by the CPU 114.

Figure 4:
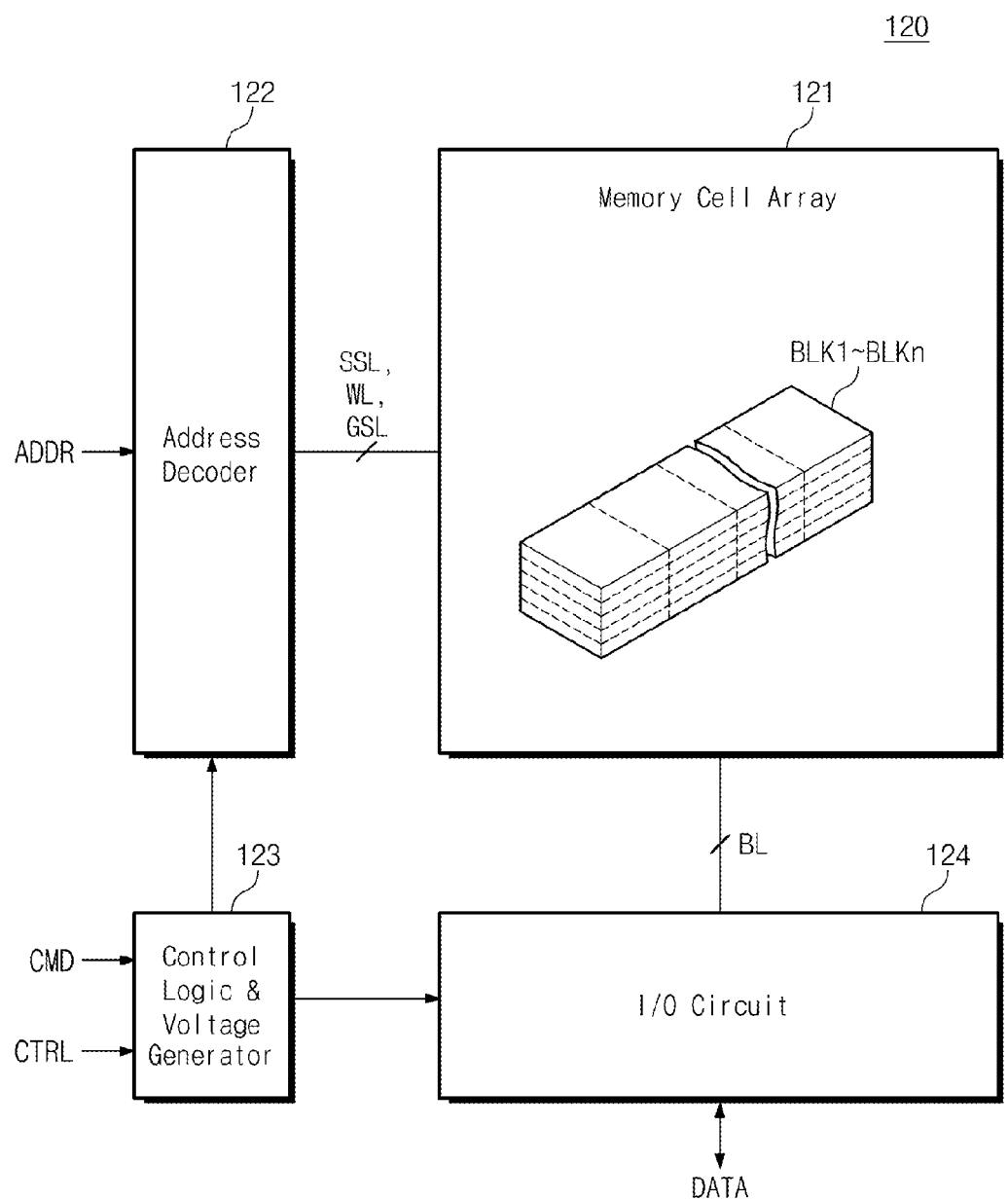
FIG. 4 is a block diagram schematically illustrating a nonvolatile memory device shown in FIG. 1.

FIG. 4 is a block diagram schematically illustrating a nonvolatile memory device shown in FIG. 1. Referring to FIGS. 1 and 4, a nonvolatile memory device 120 includes a memory cell array 121, an address decoder 122, a control logic and voltage generator block 123, and an input/output circuit 124.

The memory cell array 121 includes a plurality of memory blocks. Each of the memory blocks includes a plurality of strings each having a plurality of memory cells. The memory cells may be connected to a plurality of word lines, respectively. Each of the memory cells may be a single level cell storing one bit or a multi-level cell storing at least two bits.

In exemplary embodiments, the memory blocks may have a three-dimensional structure. The memory block structure will be more fully described with reference to FIG. 5.

In exemplary embodiments, a portion of the memory blocks BLK1 to BLKn of the memory cell array 121 may be used as a meta area, and a block order table BOT, a program time stamp table PTS, and a predefined table PDT described with reference to FIG. 1 may be stored at the meta area.

The address decoder 122 is connected to the memory cell array 121 via a plurality of word lines WL, string select lines SSL, and ground selection lines GSL. The address decoder 122 is configured to decode a physical address ADDR_p received from the memory controller 110 to and drive the word lines WL according to the decoding result. For example, the physical address ADDR_p may contain a physical block number PBN and a physical page number PPN. The address decoder 122 selects a memory block corresponding to a physical block number PBN included in the physical address ADDR_p and then selects a page corresponding to a physical page number PPN included in the physical address ADDR_p, from among a plurality of pages of the selected block. The address decoder 122 controls voltages of the word lines for reading or writing on the selected page.

The control logic and voltage generator block 123 may control the address decoder 122 and the input/output circuit 124 in response to a command CMD and a control signal CTRL from the memory controller 110. For example, the control logic and voltage generator block 123 may control the address decoder 122 and the input/output circuit 124 such that data is written at the memory cell array 121 in response to the signals from the memory controller 110. Or, the control logic and voltage generator block 123 may control the address decoder 122 and the input/output circuit 124 such that data stored at the memory cell array 121 is output in response to the signals from the memory controller 110. Alternatively, the control logic and voltage generator block 123 may control the address decoder 122 and the input/output circuit 124 such that a portion of the memory cell array 121 is erased in response to the signals from the memory controller 110.

The control logic and voltage generator block 123 may generate various voltages required for the nonvolatile memory device 120 to operate. For example, the control logic and voltage generator block 123 may generate a plurality of selection read voltages, a plurality of non-selection read voltages, a plurality of program voltages, a plurality of pass voltages, a plurality of erase voltages, and so on and may transfer them to the address decoder 122 and the memory cell array 121.

In exemplary embodiments, the control logic and voltage generator block 123 may adjust levels of selection read voltages under a control of the memory controller 110. For example, the control logic and voltage generator block 123 may generate one of a plurality of selection read voltage sets under a control of the memory controller 110. The address decoder 122 may supply the selection read voltage set thus generated to a selected one of a plurality of word lines.

The input/output circuit 124 is connected to the memory cell array 121 via bit lines BL. The input/output circuit 124 may control the bit lines BL such that data from the memory controller 110 is written at the memory cell array 121. Or, the input/output circuit 124 may control the bit lines BL such that data written at the memory cell array 121 is output.

Although not shown, the input/output circuit 124 may comprise the following: a page buffer (or, a page register), a column selector, a data buffer, and a global buffer. Alternatively, the input/output circuit 124 may comprise the following: a sense amplifier, a write driver, a column selector, and a data buffer.

Figure 5:
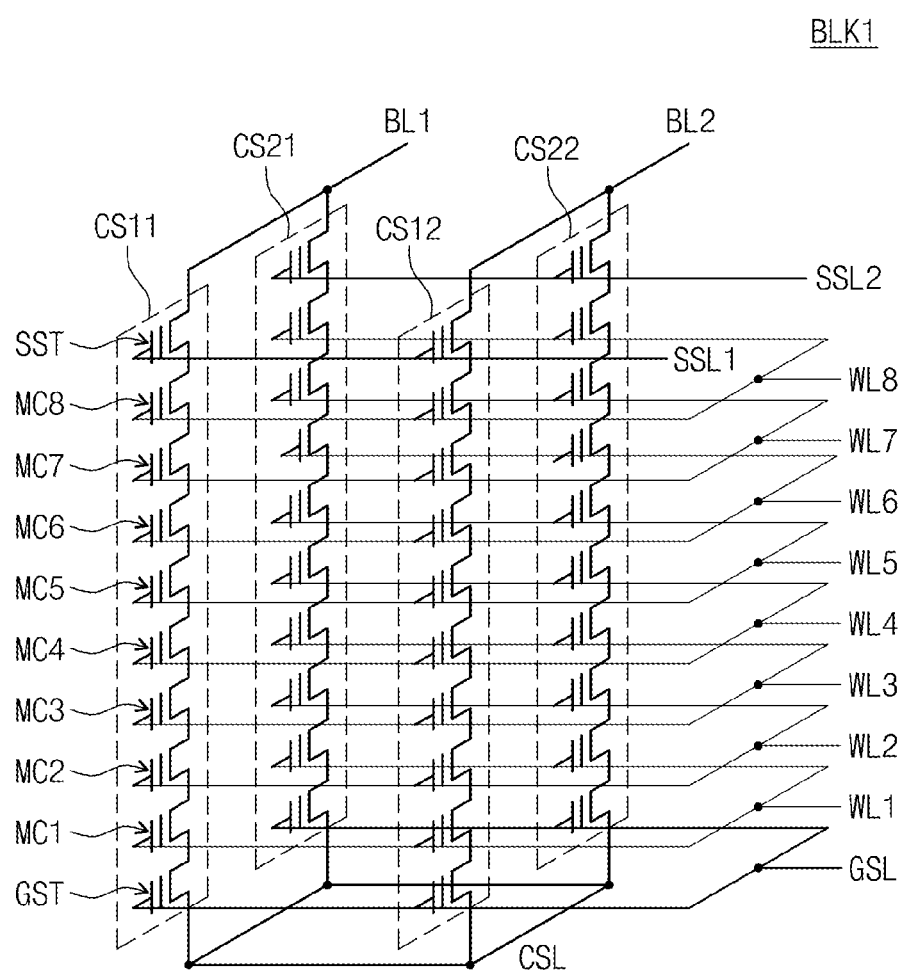
FIG. 5 is a circuit diagram schematically illustrating a first memory block of a memory cell array shown in FIG. 4.

FIG. 5 is a circuit diagram schematically illustrating a first memory block of a memory cell array shown in FIG. 4. Below, a first memory block BLK1 will be described with reference to FIG. 5. However, the application is not limited thereto. The remaining memory blocks BLK2 to BLKn may also have the same structure as the first memory block BLK1.

Referring to FIGS. 4 and 5, the first memory block BLK1 includes a plurality of cell strings CS11, CS12, CS21 and CS22. The cell strings CS11, CS12, CS21 and CS22 are arranged along a row direction and a column direction to form rows and columns.

Each of the cell strings CS11, CS12, CS21 and CS22 may include a plurality of cell transistors. The cell transistors includes a string select transistor SST, a plurality of memory cells MC1~MC8 and a ground select transistor GST. In each of the strings CS11, CS12, CS21 and CS22, the string select transistor SST is connected to a string select line SSL. The string select line SSL may be divided into first and second string select lines SSL1 and SSL2. In each of the strings CS11, CS12, CS21 and CS22, the memory cells MC1~MC8 are connected to word lines WL1~WL8, respectively. Word lines having the same height are connected in common. In each of the strings CS11, CS12, CS21 and CS22, the ground select transistor GST is connected to a ground select line GSL. Each cell string is connected between a bit line BL and a common source line CSL. That is, the string select transistor SST is connected to the bit line BL and the ground select transistor GST is connected to the common source line CSL.

Cell strings disposed in the same column are connected to the same bit line. For example, the cell strings CS11 and CS21 are connected to a first bit line BL1. The cell strings CS12 and CS22 are connected to a second bit line BL2.

Cell strings disposed in the same row are connected to the same string select line. For example, the cell strings CS11 and CS12 are connected to the first string select line SSL1. The cell strings CS21 and CS22 are connected to the second string select line SSL2.

Each of the cell strings CS11, CS12, CS21 and CS22 is stacked in a direction perpendicular to a substrate (not shown). For example, the ground select transistor GST, the memory cells MC1~MC8 and the string select transistor SST may be stacked in the direction perpendicular to the substrate to be formed. In exemplary embodiments, the memory cells MC1~MC8 may be constituted by charge trap flash (CTF) memory cells.

The first memory block BLK1 illustrated in FIG. 5 is illustrative, but the application is not limited thereto. For example, the number of rows of cell strings may be increased or reduced. As the number of rows of cell strings is changed, the number of string select lines or ground select lines connected to rows of the cell strings and the number of cell strings connected to one bit line may also be changed.

The number of columns of cell strings may be increased or reduced. As the number of columns of cell strings is changed, the number of bit lines connected to columns of the cell strings and the number of cell strings connected to one string select line may also be changed.

A height of cell strings may be increased or reduced. For example, the number of memory cells being stacked in each cell string may be increased or reduced. As the number of memory cells being stacked in each cell string is changed, the number of word lines may also be changed.

The number of string select transistors or ground select transistors being provided to each cell string may be increased. For example, as the number of string select transistors or ground select transistors being provided each cell string is changed, the number of string select lines or ground select lines may also be changed. In the case that the number of string select lines or ground select lines is increased, the string select lines or the ground select lines may be stacked in the same form as the memory cells MC1~MC8.

In exemplary embodiments, write and read operations may be performed by a row unit of the cell strings CS11, CS12, CS21 and CS22. The cell strings CS11, CS12, CS21 and CS22 may be selected by one row unit by the string select lines SSL1 and SSL2.

In a selected row of the cell strings CS11, CS12, CS21 and CS22, write and read operations may be performed by a page unit. The page may be one row of memory cells connected to one word line. Alternatively, the page may be a unit of data stored in one row of memory cells connected to one word line. In a selected row of the cell strings CS11, CS12, CS21 and CS22, memory cells may be selected by a page unit by the word lines WL1~WL8.

Figure 7:
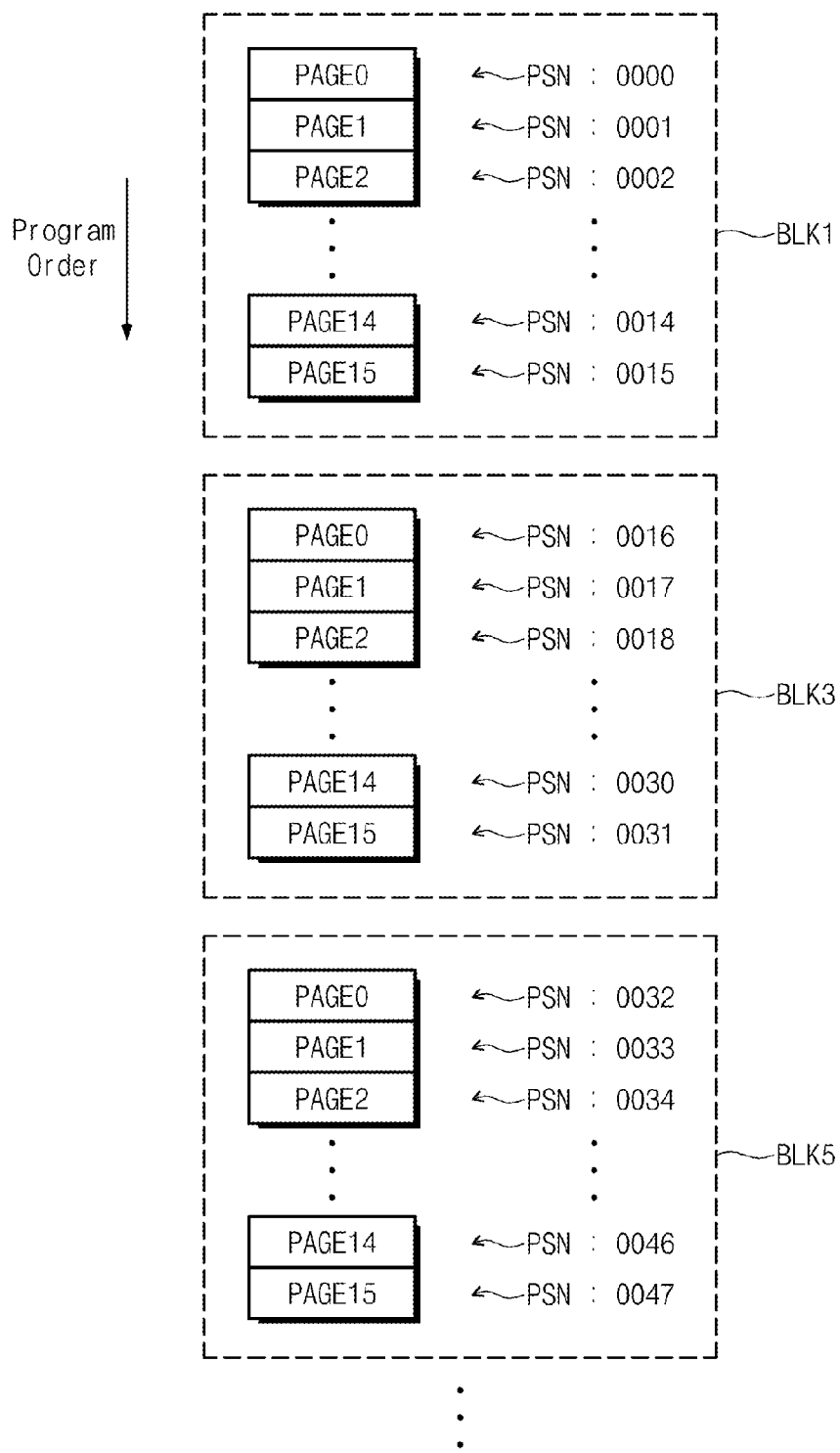

FIGS. 6 and 7 are diagrams for describing a block order table shown in FIG. 1. Referring to FIGS. 1 and 6, a block order table BOT includes information on a block allocation order. For example, a memory controller 110 sequentially allocates a plurality of memory blocks BLK1 to BLKn. The memory controller 110 allocates memory blocks with consideration for the wear-level of each memory block. The memory controller 110 stores information on allocation order of the memory blocks at a block order table BOT. Referring to the block order table BOT shown in FIG. 6, the memory controller 110 first allocates a first memory block BLK1 and then sequentially allocates a third memory block BLK3, a fifth memory block BLK5, a seventh memory block BLK7, and an eighth memory block BLK8.

If all pages of the eighth memory block BLK8 are programmed, the memory controller 110 may select one of memory blocks with consideration for the wear-level of each memory block and may store the selected memory block information (e.g., a physical block number PBN) in the block order table BOT, such as the selected memory block information corresponding to a BOT index value of 6.

In exemplary embodiments, the BOT index of the block order table BOT denotes an allocation order of memory blocks. The total number of BOT index values may be equal to the total number of memory blocks. Alternatively, the total number of BOT index values may be equal to the total number of remaining memory blocks other than reserved blocks.

Referring to FIGS. 1, 6, and 7, the memory controller 110 may generate page serial numbers PSN of pages using the block order table BOT. As illustrated in FIG. 6, the memory controller 110 may allocate a first memory block BLK1 as a write block. Data may be sequentially written at a plurality of pages PAGE0 to PAGE15 of the first memory block BLK1 under a control of the memory controller 110.

For example, a $0^{th}$ page PAGE0 of the first memory block BLK1 has a page serial number PSN of '0000', a $1^{st}$ page PAGE1 of the first memory block BLK1 has a page serial number PSN of '0001', and a 2$^{nd}$ page PAGE2 of the first memory block BLK1 has a page serial number PSN of '0002'.

Likewise, a 14$^{th}$ page PAGE14 and a 15$^{th}$ page PAGE15 of the first memory block BLK1 have a page serial number PSN of '0014' and a page serial number PSN of '0015', respectively. As described above, the memory controller 110 sequentially stores data at the pages PAGE0 to PAGE15 of the first memory block BLK1 allocated, and page serial numbers are allocated to the pages according to the writing order.

As shown in FIG. 6, when data is stored at all pages PAGE0 to PAGE15 of the first memory block BLK1 or the first memory block BLK1 does not include a writable page (or a free-page), the memory controller 110 may allocate a third memory block BLK3 as a write block. The memory controller 110 sequentially stores data at pages PAGE0 through PAGE15 of the third memory block BLK3 allocated, and page serial numbers are allocated to the pages according to the writing order. In exemplary embodiments, page serial numbers of pages of the third memory block BLK3 may be continuative to those of pages of the first memory block BLK1 (i.e., a memory block previously allocated as a write block).

Like the above description, afterwards, the memory controller 110 allocates a fifth memory block BLK5 to a write block and sequentially stores data at pages PAGE0 through PAGE15 of the fifth memory block BLK5 allocated. The memory controller 110 allocates page serial numbers to the pages PAGE0 through PAGE15 of the fifth memory block BLK5 according to the writing order.

As described above, the memory controller 110 may manage page serial numbers PSN of pages, based on an allocation order of a memory block. For example, page serial numbers PSN may be determined according to a writing order of pages. Thus, the page serial number PSN of each page denotes information on a writing order of each page For ease of description, the application has been described with reference to first, third, and fifth memory blocks BLK1, BLK3, and BLK5. However, the application is not limited thereto. Also, an embodiment of the application is exemplified in FIG. 7 as each of first, third, and fifth memory blocks BLK1, BLK3, and BLK5 includes pages PAGE0 through PAGE15. However, the application is not limited thereto. For example, each memory block may include more pages. Reference numerals and values shown in FIGS. 6 and 7 are exemplary.

Figure 9:
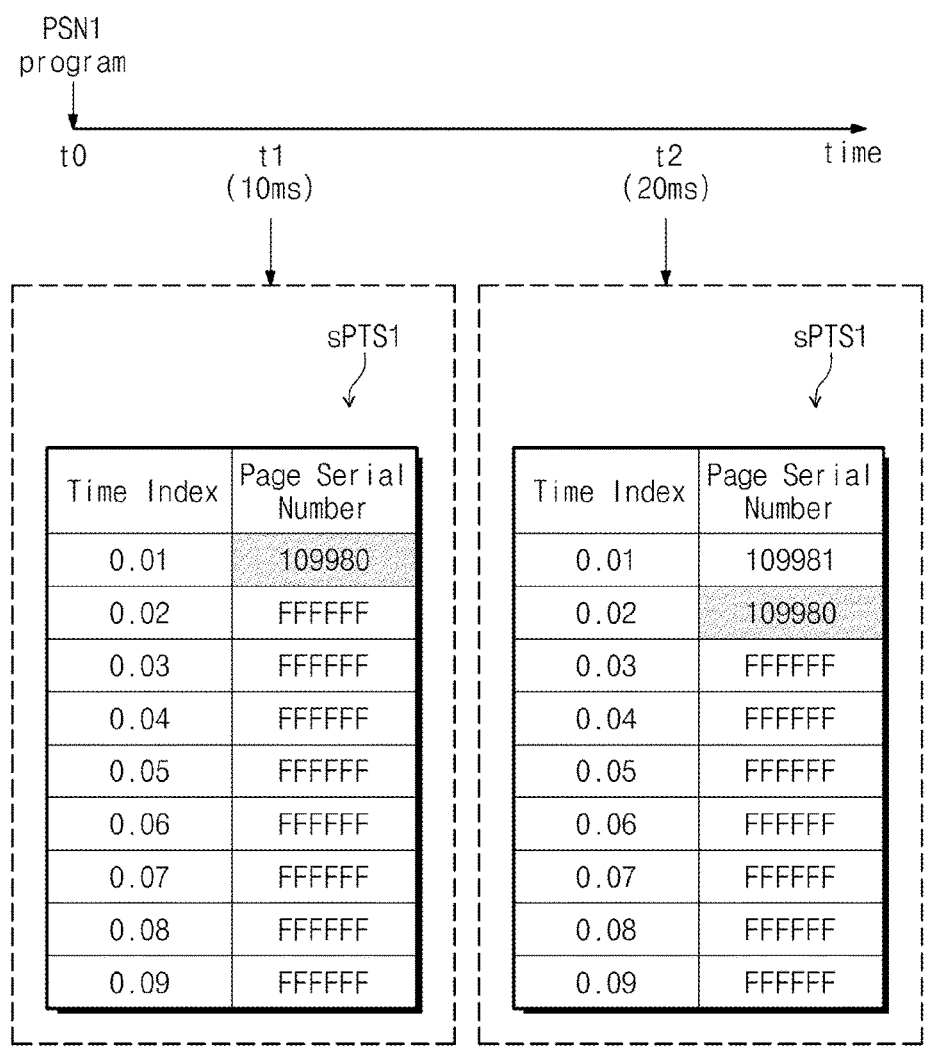
Figure 10:
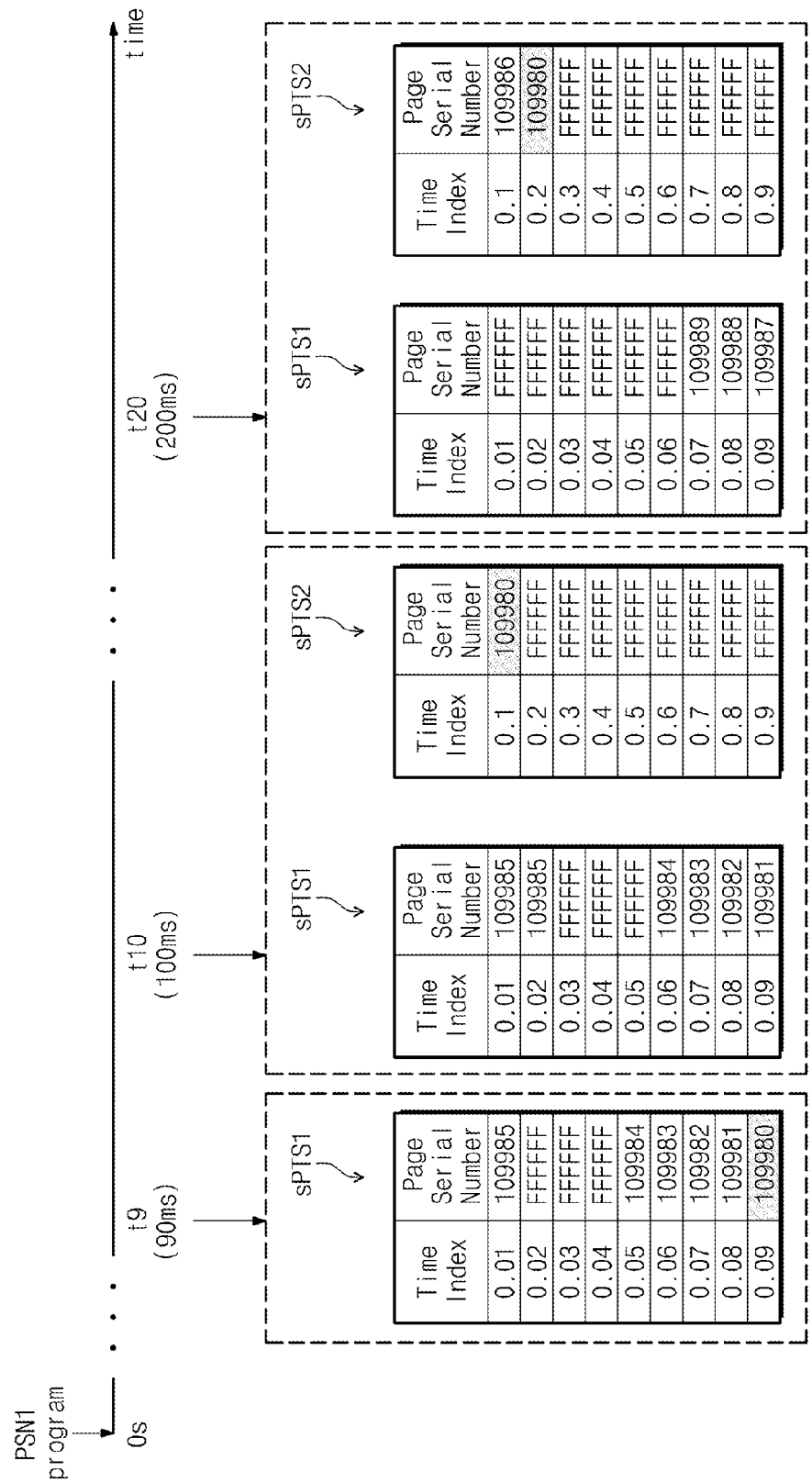

FIGS. 8 to 10 are diagrams for describing a program time stamp table shown in FIG. 1. Referring to FIGS. 1 and 8 to 10, a memory controller 110 may manage a program time stamp table PTS. The program time stamp table PTS may include a plurality of sub program time stamp tables sPTS1 through sPTSk (hereinafter, referred to as sub tables). Each of the sub tables sPTS1 to sPTSk may include time index information and page serial number information. In exemplary embodiments, the time index information indicates a program elapsed time. Below, for ease of description, a time index of the program time stamp table PTS is referred to as "a program elapsed time".

A time index of each of the sub tables sPTS1 to sPTSk may be managed by different units. For example, a time index of the first sub table sPTS1 may be managed by the unit of 10 milliseconds. That is, the first sub table sPTS1 may be updated every 10 milliseconds. A time index of the second sub table sPTS2 may be managed by the unit of 100 milliseconds. That is, the second sub table sPTS2 may be updated every 100 milliseconds. A time index of the third sub table sPTS3 may be managed by the unit of 1 second. That is, the third sub table sPTS3 may be updated every 1 second. It is understood from the above description that the sub tables sPTS1 to sPTSk are managed in logarithmic scale.

For example, as illustrated in FIG. 9, data is written at a page corresponding to a first page serial number PSN1 at t0. For ease of description, it will be assumed that the first page serial number PSN1 is '109980'. The memory controller 110 updates the first sub table sPTS1 at t1 (i.e., a point in time when 10 ms elapses from t0). That is, at t1, the first page serial number PSN1 is written at the first sub table sPTS1 to correspond with a first time index of '0.01'.

At t2 (i.e., a point in time when 20 milliseconds elapse from t0), the memory controller 110 updates the first sub table sPTS1. For example, at t2, the first page serial number PSN1 written at a first time index entry (0.01) is shifted into a second time index entry (0.02), and another page serial number PSN of '109981' is written at the first time index entry (0.01). For example, another page serial number PSN of '109981' may be a page serial number PSN corresponding to one of pages that are written between t1 and t2.

As illustrated in FIG. 10, the memory controller 110 updates the first sub table sPTS1 every 10 milliseconds until t9 (i.e., a point in time when 90 milliseconds elapses from t0) in the above-described way.

At t10 (i.e., a point in time when 100 milliseconds elapse from t0), the memory controller 110 updates the first and second sub tables sPTS1 and sPTS2. For example, the first page serial number PSN1 of '109980' is deleted from the first sub table sPTS1, while it is written at a first time index entry (0.1) of the second sub table sPTS2. In exemplary embodiments, a time index of the second sub table sPTS2 may be managed by the unit of 100 milliseconds.

Afterwards, at t20 (i.e., a point in time when 200 milliseconds elapse from t0), the memory controller 110 updates the first and second sub tables sPTS1 and sPTS2. That is, the second sub table sPTS2 may be updated every 100 milliseconds.

As described above, the memory controller 110 manages program elapsed times and page serial numbers by the unit of 10 milliseconds, based on the first sub table sPTS1. The memory controller 110 manages program elapsed times and page serial numbers by the unit of 100 milliseconds, based on the second sub table sPTS2. That is, the memory controller 110 manages program elapsed times of pages, depending on a plurality of sub tables sPTS1 to sPTSk which are managed using different time indexes.

Reference numerals (e.g., page serial numbers PSN) and time index units described with reference to FIGS. 8 to 10 are exemplary, and the application is not limited thereto. For example, change or modification on time index units of the sub tables sPTS1 to sPTSk may be variously made. Also, page serial numbers PSNs may increase sequentially or non-sequentially.

As described with reference to FIGS. 8 to 10, the program time stamp table PTS includes a plurality of sub tables sPTS each of which is periodically updated. At this time, the program time stamp tables PTS must be updated at a given time to manage program elapsed times, thereby increasing overhead due to the updating of the program time stamp table PTS. Alternatively, when a nonvolatile memory system 100 performs a sequential read operation, the program time stamp table PTS may not be updated at a given time. Alternatively, when a nonvolatile memory system 100 perform a sequential read operation, the program time stamp table PTS may be updated at a given time, thereby resulting in a decrease in performance of the nonvolatile memory system 100.

To solve the above problem, the memory controller 110 according to an embodiment of the application updates the program time stamp table PTS while the nonvolatile memory device 120 performs a program operation. That is, since the program time stamp table PTS does not have to be updated periodically, the overhead due to updating of the program time stamp table PTS decreases.

Figure 11:
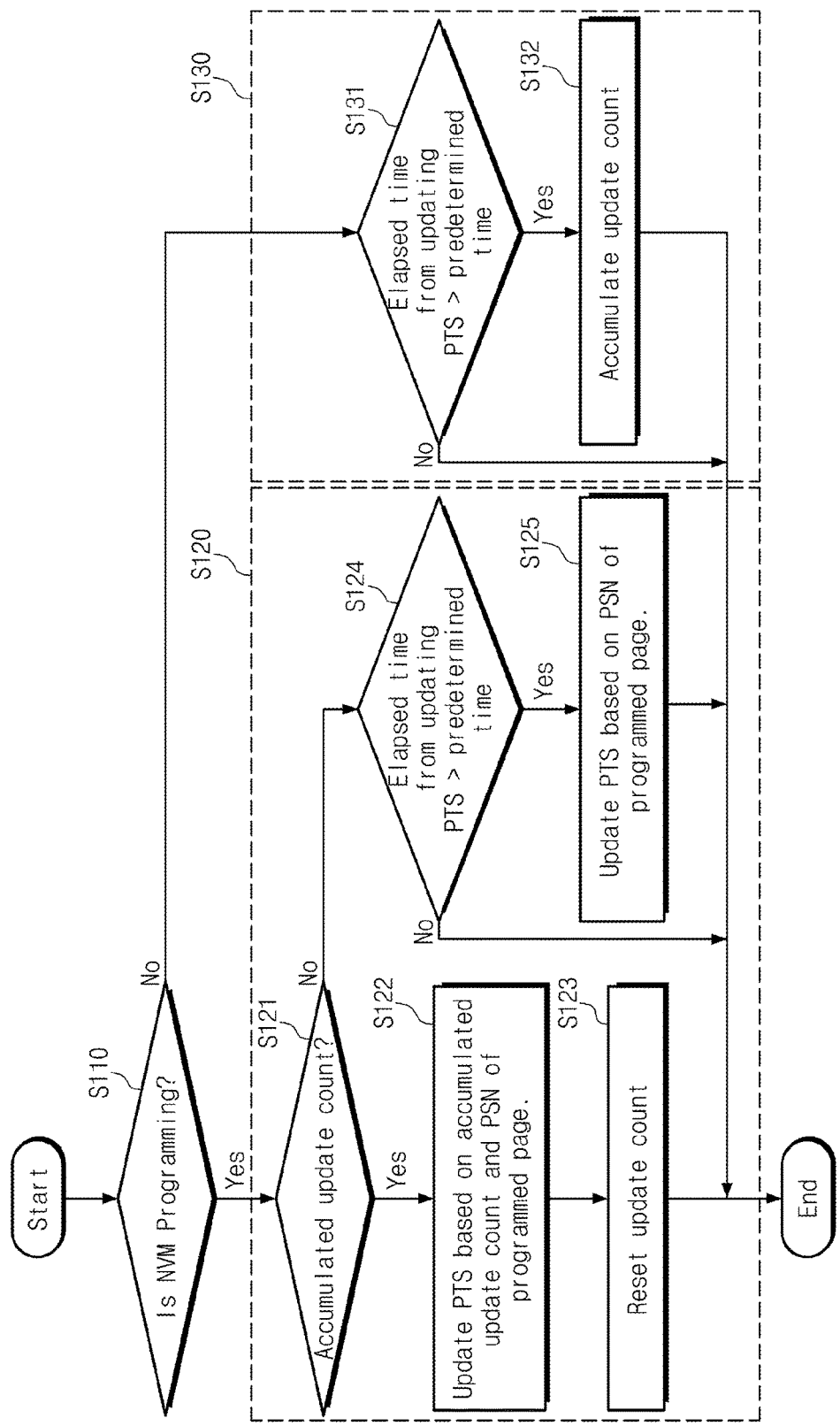
FIG. 11 is a flow chart schematically illustrating an operation of a memory controller shown in FIG. 1.

FIG. 11 is a flow chart schematically illustrating an operation of a memory controller shown in FIG. 1. Referring to FIGS. 1 and 11, in step S110, a memory controller 110 determines whether a nonvolatile memory device 120 is performing a program operation. For example, the memory controller 110 may control a program operation of the nonvolatile memory device 120 in response to a request RQ and a logical address ADDR_l from an external device (e.g., a host or an application processor). For this control, the memory controller 110 transmits data, a physical address ADDR_p, and a command CMD to the nonvolatile memory device 120. The memory controller 110 determines whether the nonvolatile memory device 120 is performing a program operation, based on the transmitted command CMD. Alternatively, the memory controller 110 determines whether the nonvolatile memory device 120 is performing the program operation, based on an output signal (e.g., a ready/busy signal RnB) of the nonvolatile memory device 120. For example, the memory controller 110 may periodically perform an operation of step S110.

When the nonvolatile memory device 120 is performing the program operation, in step S120, the memory controller 110 updates a program time stamp table PTS. For example, the step S120 includes steps S121 to S125 where the program time stamp table PTS is updated under the control of the memory controller 110.

In the step S121, the memory controller 110 determines whether an accumulated update count exists. For example, as described with reference to FIG. 1, a PTS managing unit 111 includes a counter 111a. The counter 111a may renew an update count. If a predetermined time elapses without performing a program operation, the update count of the counter 111a is updated (e.g., is renewed or is accumulated). Alternatively, the update count of the counter 111a is periodically updated while the nonvolatile memory device 120 does not perform a program operation. The memory controller 110 determines whether an update count of the counter 111a is accumulated.

When the accumulated update count exists, in the step S122, the memory controller 110 updates the program time stamp table PTS, depending on the accumulated update count and a page serial number PSN of a programmed page. For example, the nonvolatile memory device 120 programs data at a first page under a control of the memory controller 110. The memory controller 110 generates a page serial number PSN of the first page and then updates the program time stamp table PTS, depending on the page serial number PSN thus generated and the accumulated update count.

In the step S123, the memory controller 110 resets the update count. For example, the memory controller 110 sets an accumulated update count of the counter 111a to '0'.

As a consequence of determining that the accumulated update count does not exist, in the step S124, the memory controller 110 determines whether an elapsed time from a point in time when the program time stamp table PTS is updated is over a predetermined time.

As a consequence of determining that an elapsed time, from a point in time when the program time stamp table PTS is updated, is over a predetermined time, in step S125, the memory controller 110 updates the program time stamp table PTS, depending on a page serial number PSN of a programmed page. For example, the memory controller 110 generates a page serial number of a programmed page (i.e., a page being programmed in the step S110) and writes the page serial number thus generated in the program time stamp table PTS.

Returning to step S110, when the nonvolatile memory device 120 is not performing the program operation, in step S130, the memory controller 110 renews an update count. For example, the memory controller 110 performs steps S131 and S132 to renew the update count.

In the step S131, the memory controller 110 determines whether an elapsed time from a point in time when the program time stamp table PTS is updated is over a predetermined time.

As a consequence of determining that an elapsed time from a point in time when the program time stamp table PTS is updated is over a predetermined time, in the step S132, the memory controller 110 renews an update count. In other word, when the nonvolatile memory device 120 does not perform the program operation during the predetermined time, the memory controller 110 renews the update count. Alternatively, while the nonvolatile memory device 120 does not perform the program operation, the memory controller 110 renews the update count periodically. That is, the memory controller 110 accumulates the update count in a predetermined time interval.

According to above described embodiments, the memory controller 110 updates the program time stamp table PTS only when the nonvolatile memory device 120 is performing the program operation. That is, the memory controller 110 does not need to update the program time stamp table PTS periodically, thereby making it possible to reduce overhead due to updating of the program time stamp table PTS. This means that there is provided a memory controller with improved performance and an operating method thereof.

Figure 12:
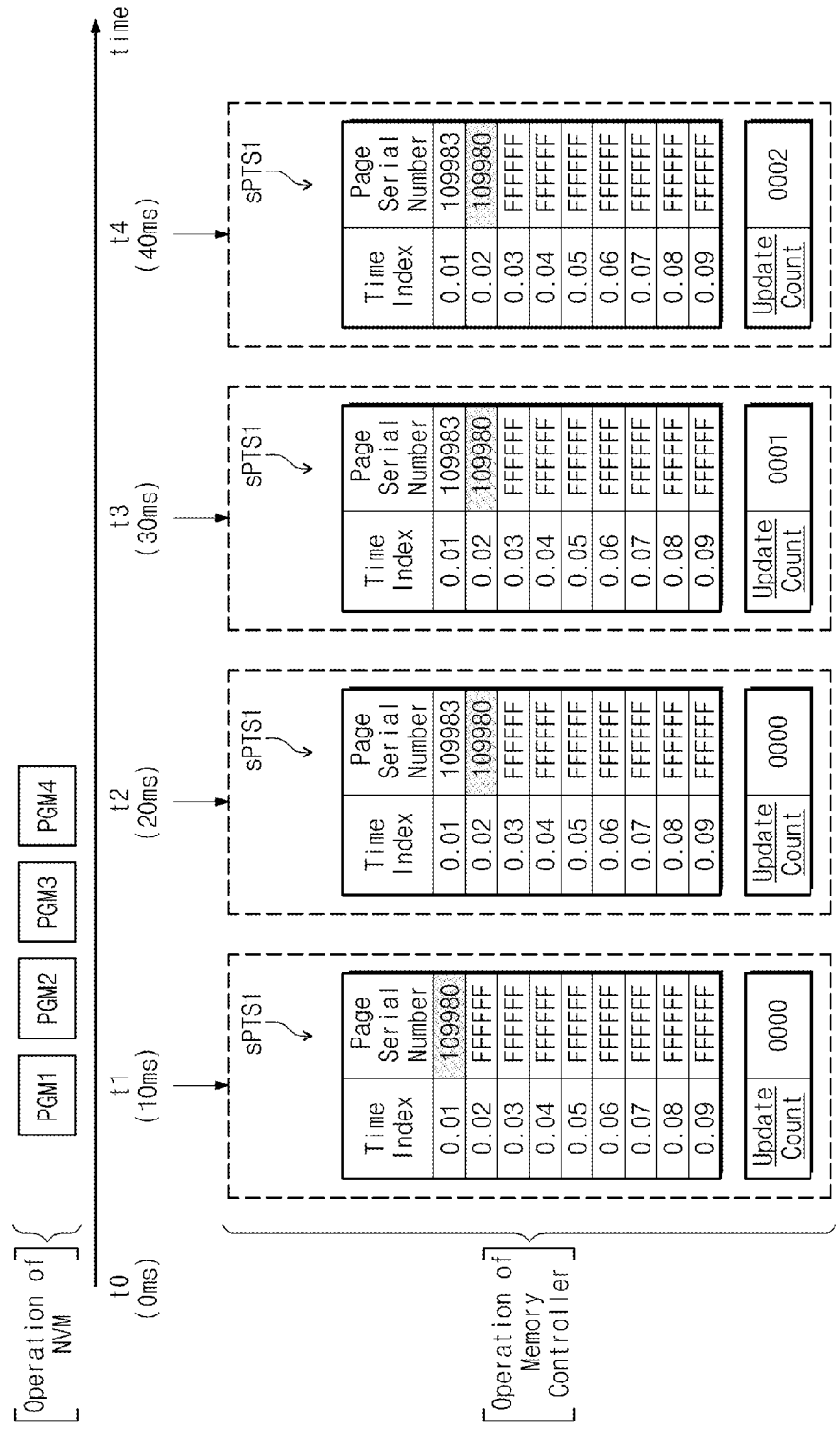
FIGS. 12 through 14 are diagrams for describing an operating method of a memory controller shown in FIG. 11.
Figure 13:
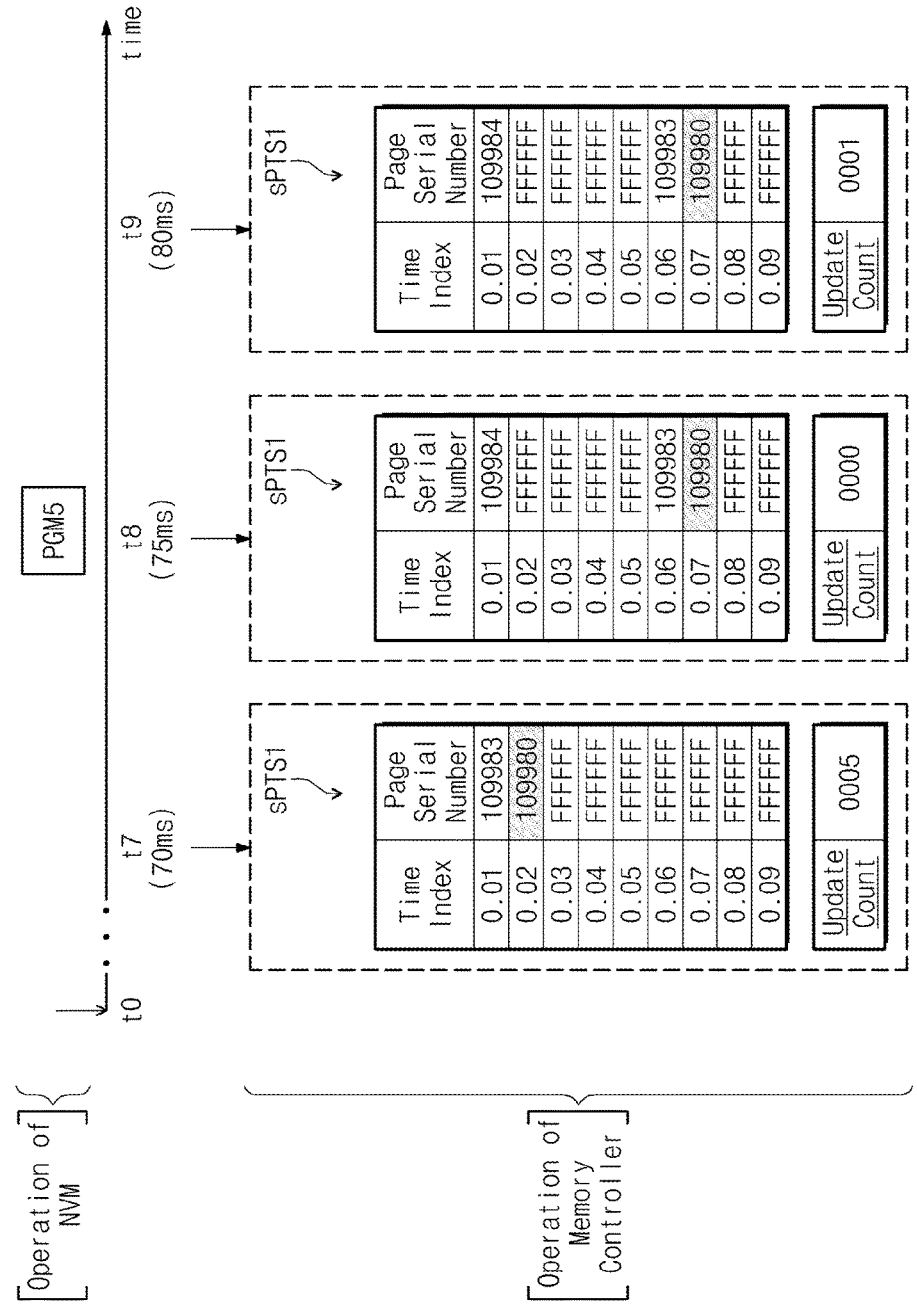
Figure 14:
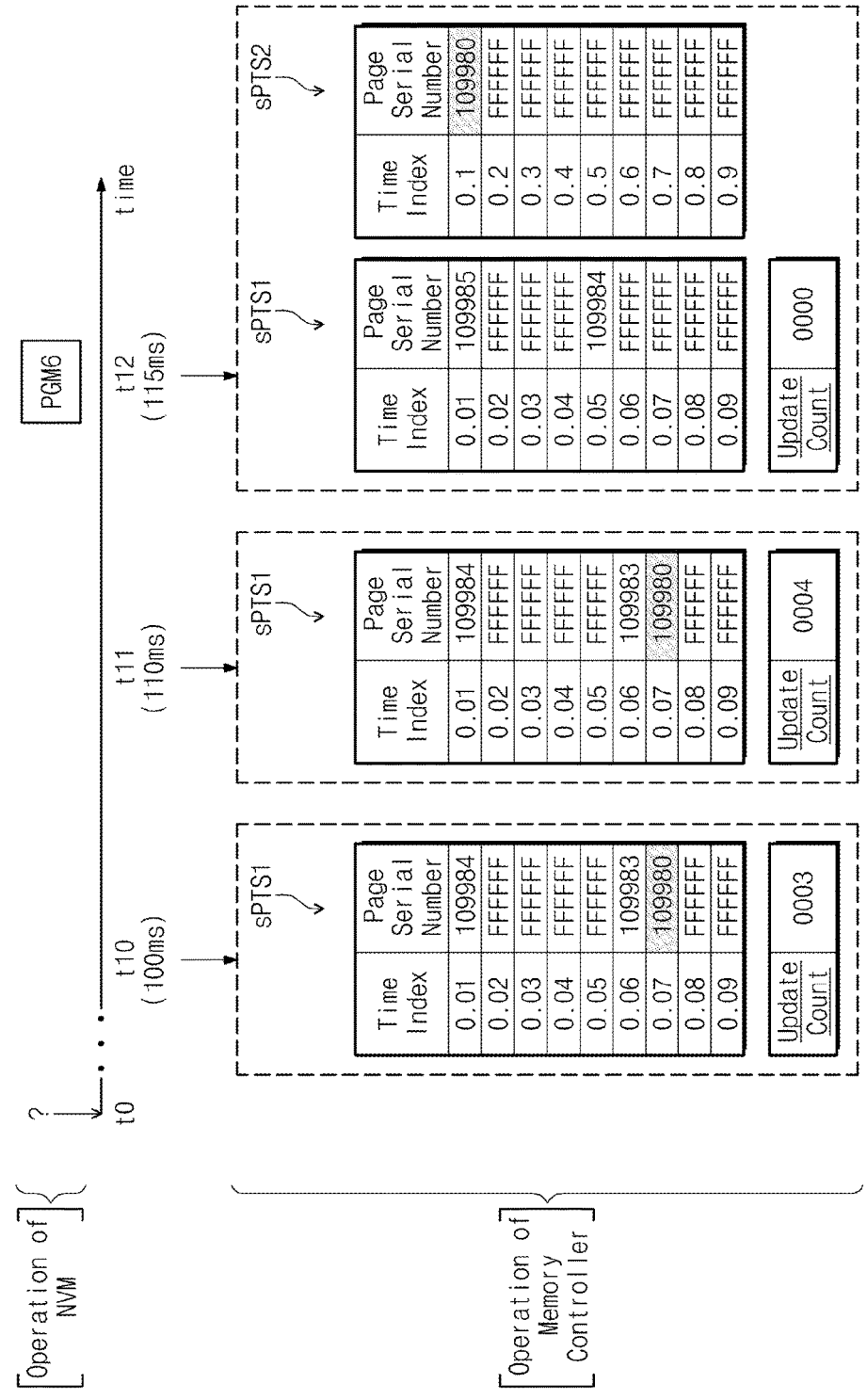

FIGS. 12 to 14 are diagrams for describing an operating method of a memory controller shown in FIG. 11. For ease of description, it will be assumed that a time index unit of a first sub table sPTS1 is 10 milliseconds. That is, the memory controller 110 updates one of a program time stamp table PTS and an update count every 10 milliseconds Referring to FIGS. 1, 11, and 12, at t1, a nonvolatile memory device 120 may be performing a program operation according to a control of a memory controller 110. For example, at t1, the nonvolatile memory device 120 performs a first program operation PGM1 on a first page. The first point in time t1 is a point in time when 10 milliseconds elapse from t0 (or, a reference point in time).

The memory controller 110 writes a page serial number PSN of '10980' of the first page being programmed at a first sub table sPTS1. For example, the memory controller 110 updates the first sub table sPTS1 such that the page serial number PSN of '10980' corresponds to a first time index (0.01) of the first sub table sPTS1.

Afterwards, the nonvolatile memory device 120 may perform program operations on other pages up to t2. For example, the nonvolatile memory device 120 further performs second and third program operations PGM2 and PGM3 up to t2 according to a control of the memory controller 110. For example, the second and third program operations PGM2 and PGM3 may be program operations on second and third pages, and a page serial number of the second page and a page serial number PSN of the third page are '109981' and '109982'.

At t2, the nonvolatile memory device 120 performs a fourth program operation PGM4 on a fourth page. At t2, the memory controller 110 updates the first sub table sPTS1, depending on a page serial number PSN of '109983' of a page (i.e., the fourth page) being programmed in the nonvolatile memory device 120.

That is, the memory controller 110 updates the program time stamp table PTS every predetermined time (i.e., 10 ms) if the nonvolatile memory device 120 is performing the program operations. Operations of the memory controller 110 at t1 and t2 may include operations corresponding to the steps S110, S121, S124, and S125 shown in FIG. 11.

The page serial numbers of the second and third pages that are programmed from t1 to t2 may be not stored at the program time stamp table PTS. Even though the page serial numbers of the second and third pages are not stored at the program time stamp table PTS, values approximate to program elapsed times of the second and third pages are analogized because page serial numbers of the first through fourth pages are stored at the program time stamp table PTS.

Referring to FIGS. 1, 11, and 12, the nonvolatile memory device 120 does not perform a program operation at t3. For example, the nonvolatile memory device 120 may perform other operations (e.g., read and erase operations) while not performing a program operation. The third point in time t3 is a point in time when 30 milliseconds elapse from t0 (i.e., a reference time), that is, an update time unit of a program time stamp table PTS of the memory controller 110. The memory controller 110 updates an update count because the nonvolatile memory device 120 does not perform a program operation at t3. For example, the update value is increased by '1' according to a control of the memory controller 110.

Likewise, the memory controller 110 increases the update value by '1' at t4. In other words, at t4, the update count has the value of '2'

Next, referring to FIGS. 1 and 11 through 13, the nonvolatile memory device 120 may not perform a program operation from t3 to t7 (i.e., until 70 milliseconds elapses from t0). In this case, the memory controller 110 periodically updates an update count up to t7, at every 10 millisecond. Operations of the memory controller 110 from t3 to t7 may include operations corresponding to the steps S110, S131, and S132 shown in FIG. 11.

Afterwards, the nonvolatile memory device 120 performs a fifth program operation PGM5 at t8 being a point in time when 75 ms elapses from t0. For example, the eighth point in time t8 is a point in time when 75 milliseconds elapse from t0. That is, the eighth point in time t8 may not be an update period of the program time stamp table PTS. If the nonvolatile memory device 120 performs the fifth program operation PGM5 at t8, however, the memory controller 110 determines whether an update count exists.

For example, an update count may have value of '5' at t7. At t8, the memory controller 110 updates the first sub table sPTS1, depending on the update count of '5'. The memory controller 110 shifts page serial numbers of the first sub table sPTS1 as much as '5' and writes a page serial number PSN of '109984' of a page being programmed (i.e., a fifth page programmed during the fifth program operation PGM5). In other word, the page serial numbers PSN of '109980' and '109983' are shifted to time indexes of '0.07' and '0.06', respectively. And the page serial number PSN of '109984' of a page being programmed is written to a time index of '0.01'. Afterwards, the memory controller 110 resets the update count to '0'.

In exemplary embodiments, operations of the memory controller 110 updating the program time stamp table PTS using the update count may include operations corresponding to the steps S110, S121, S122, and S123 shown in FIG. 11.

Afterwards, the nonvolatile memory device 120 may not perform a program operation at t9 (i.e., a point in time when 80 milliseconds elapse from t0).

In this case, the memory controller 110 renews an update count as described with reference to FIGS. 12 and 13.

Referring to FIGS. 1 and 11 to 14, the nonvolatile memory device 120 does not a perform program operation at t10 (i.e., a point in time when 100 milliseconds elapse from t0). The nonvolatile memory device 120 does not perform a program operation during a time interval until t11 (i.e., a point in time when 110 milliseconds elapse from t0). That is, the nonvolatile memory device 120 may not perform a program operation from t9 to t10 (i.e., a point in time when 110 milliseconds elapse from t0). In this case, as described above, the memory controller 110 updates an update count periodically at every 10 milliseconds. The update count may have value of '4' at t11.

Afterwards, the nonvolatile memory device 120 may perform a sixth program operation PGM6 at t12 (i.e., a point in time when 115 milliseconds elapses from t0). At this time, the memory controller 110 updates the program time stamp table PTS using the update count. For example, the memory controller 110 shifts page serial numbers of the first sub table sPTS1 as much as 4 and writes a page serial number PSN of '109985' of a page being programmed (i.e., a sixth page being programmed by the sixth program operation PGM6).

A page serial number PSN of '109980' of a page being programmed (i.e., a page programmed by the first program operation PGM1) is written at a second sub table sPTS2. For example, sub tables included in the program time stamp table PTS may have different update periods. For example, an update period of the first sub table sPTS1 may be 10 milliseconds, and an update period of the second sub table sPTS2 may be 100 milliseconds. That is, a tenth point in time t10 may be a point in time when the second sub table sPTS2 is updated. However, since the nonvolatile memory device 120 does not perform a program operation at t10, after t10, the memory controller 110 updates the second sub table sPTS2 at t12 when a program operation is carried out. For example, the memory controller 110 may store a page serial number PSN of '109980' of a first page at the second sub table sPTS2, such as the page serial number PSN of '109980' corresponding to a time index of "0.1".

Although not shown in figures, the memory controller 110 may update a program time stamp table, depending on page serial numbers of any other pages except for a page being programmed. For example, referring to FIG. 12, at t2, the memory controller may update the first sub table sPTS1 based on page serial numbers of '109981' and '109982' corresponding to second and third pages, not a page serial number PSN of '109983' corresponding to a fourth page.

The memory controller 110 according to an embodiment of the application periodically updates the program time stamp table PTS while the nonvolatile memory device 120 is performing a program operation. Alternatively, the memory controller 110 periodically updates an update count when the nonvolatile memory device 120 does not perform a program operation. Afterwards, the memory controller 110 updates the program time stamp table PTS, depending on the update count updated when the nonvolatile memory device 120 performs a program operation. Thus, it is possible to reduce overhead due to updating of the program time stamp table PTS. This means that there is provided a memory controller with improved performance and an operating method thereof.

Figure 15:
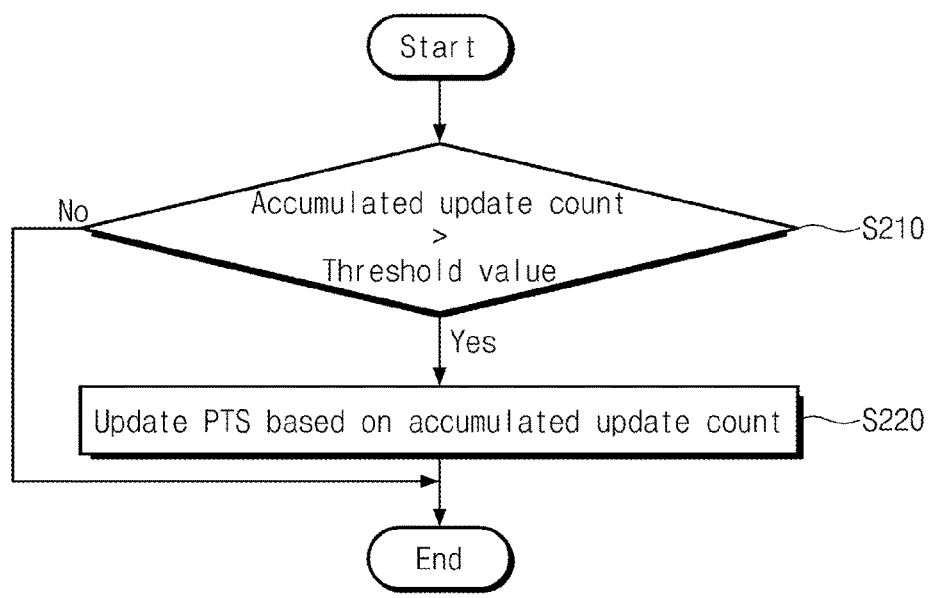
FIG. 15 is a flow chart schematically illustrating another operation of a memory controller shown in FIG. 1.

FIG. 15 is a flow chart schematically illustrating another operation of a memory controller shown in FIG. 1. Referring to FIGS. 1 and 15, in step S210, a memory controller 110 determines whether an accumulated update count is greater than a threshold value. For example, the memory controller 110 operates according to a method described with reference to FIGS. 11 to 14. At this time, if a nonvolatile memory device does not perform a program operation during a specific time, the memory controller 110 may periodically update or accumulate an update count. The memory controller 110 compares the accumulated update count with the threshold value.

When the accumulated update count is greater than the threshold value, in step S220, the memory controller 110 updates a program time stamp table PTS, depending on the accumulated update count. That is, although programming of the nonvolatile memory device 120 is not conducted, the memory controller 110 updates the program time stamp table PTS according to the accumulated update count when the accumulated update count is greater than the threshold value.

Although not shown in figures, the memory controller 110 may perform an operation of updating the program time stamp table PTS as a background operation. For example, a nonvolatile memory system 100 may maintain an idle state during a predetermined time. The idle state may denote a state where communications are not made between the nonvolatile memory system 100 and an external device or are minimally made between the nonvolatile memory system 100 and an external device. At this time, the memory controller 110 renews or accumulates the update count periodically. If the idle state of the nonvolatile memory system 100 is maintained over a specific time, the memory controller 110 may perform background operations including, but not limited to, a merge operation and a garbage collection operation. As the memory controller 110 operates a background operation, so it updates the program time stamp table PTS, depending on the accumulated update count.

With another embodiment of the application, when an accumulated update count is greater than a threshold value or when the memory controller 110 is at an idle state during a predetermined time, the memory controller 110 updates the program time stamp table PTS, depending on the accumulated update count.

Figure 16:
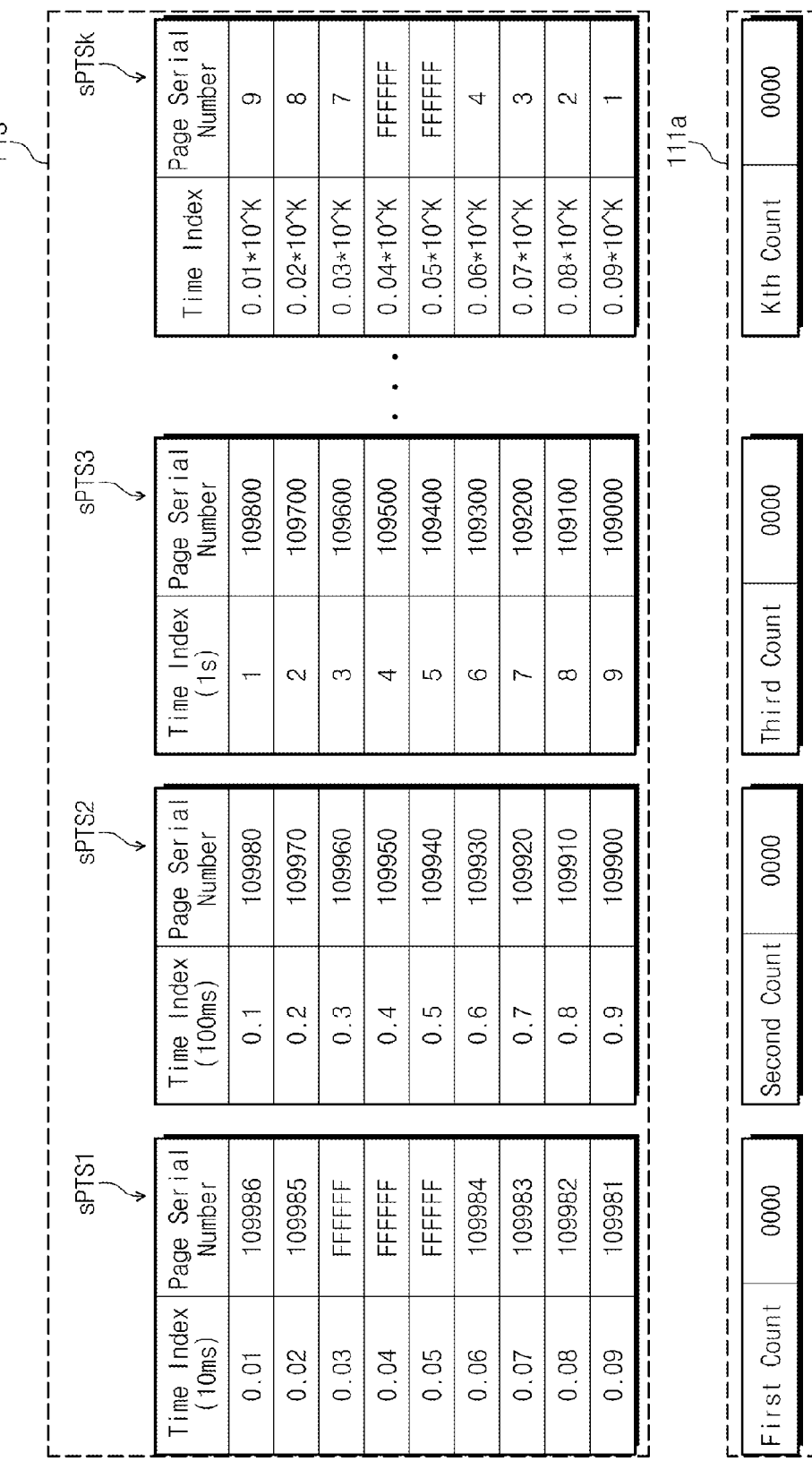
FIG. 16 is a diagram for describing an operation of a memory controller according to still another embodiment of the application.

FIG. 16 is a diagram for describing an operation of a memory controller according to still another embodiment of the application. Referring to FIGS. 1 and 16, a memory controller 110 contains a program time stamp table PTS and a counter 111a. The program time stamp table PTS has been described with reference to FIG. 8, and a description thereof is thus omitted here.

The counter 111a includes a plurality of update counts. For example, the counter 111a may include first to k-th update counts. Each of the first to k-th update counts is periodically renewed. Update periods of the first to k-th update counts are different from each other. The first to k-th update counts correspond to first through k-th sub tables sPTS1 to sPTSk, respectively. That is, a renew period of the first update count may be equal to that of the first sub table sPTS1 and a renew period of the second update count may be equal to that of the first sub table sPTS1. In exemplary embodiments, as described with reference to FIG. 1, the counter 111a may be included in a PTS managing unit 111. Alternatively, the counter 111a may be stored in a SRAM 115 (shown FIG. 2) and be driven by the PTS managing unit 111 or a CPU 114.

As described above, a memory controller 110 manages update counts with respect to the first to k-th sub tables sPTS1 to sPTSk. For example, it is assumed that update periods of the first to third sub table sPTS1 to sPTS3 are 10 milliseconds, 100 milliseconds, and 1000 milliseconds, respectively. At this time, if a nonvolatile memory device 120 does not perform a program operation until 1000 milliseconds elapse from t0 (refer to FIG. 12), the memory controller 110 renews the first update count at every 10 milliseconds, the second update count at every 100 milliseconds, and the third update count at every 1000 milliseconds. That is, at a point in time when 1000 milliseconds elapse from t0, the first update count, the second update count, and the third update count are '100', '10', and '1', respectively.

When the nonvolatile memory device 120 does not perform a program operation, the memory controller 110 renews a plurality of update counts, depending on the above-described method. Afterwards, when the nonvolatile memory device 120 performs a program operation, the memory controller 110 updates a program time stamp table PTS, depending on an accumulated update count (or, the renewed update count). Alternatively, if at least one of accumulated update counts is greater than a threshold value, the memory controller 110 updates the program time stamp table PTS, depending on the accumulated update counts. As another example, as the memory controller 110 performs a background operation, so it updates the program time stamp table PTS according to the accumulated update count.

Figure 17:
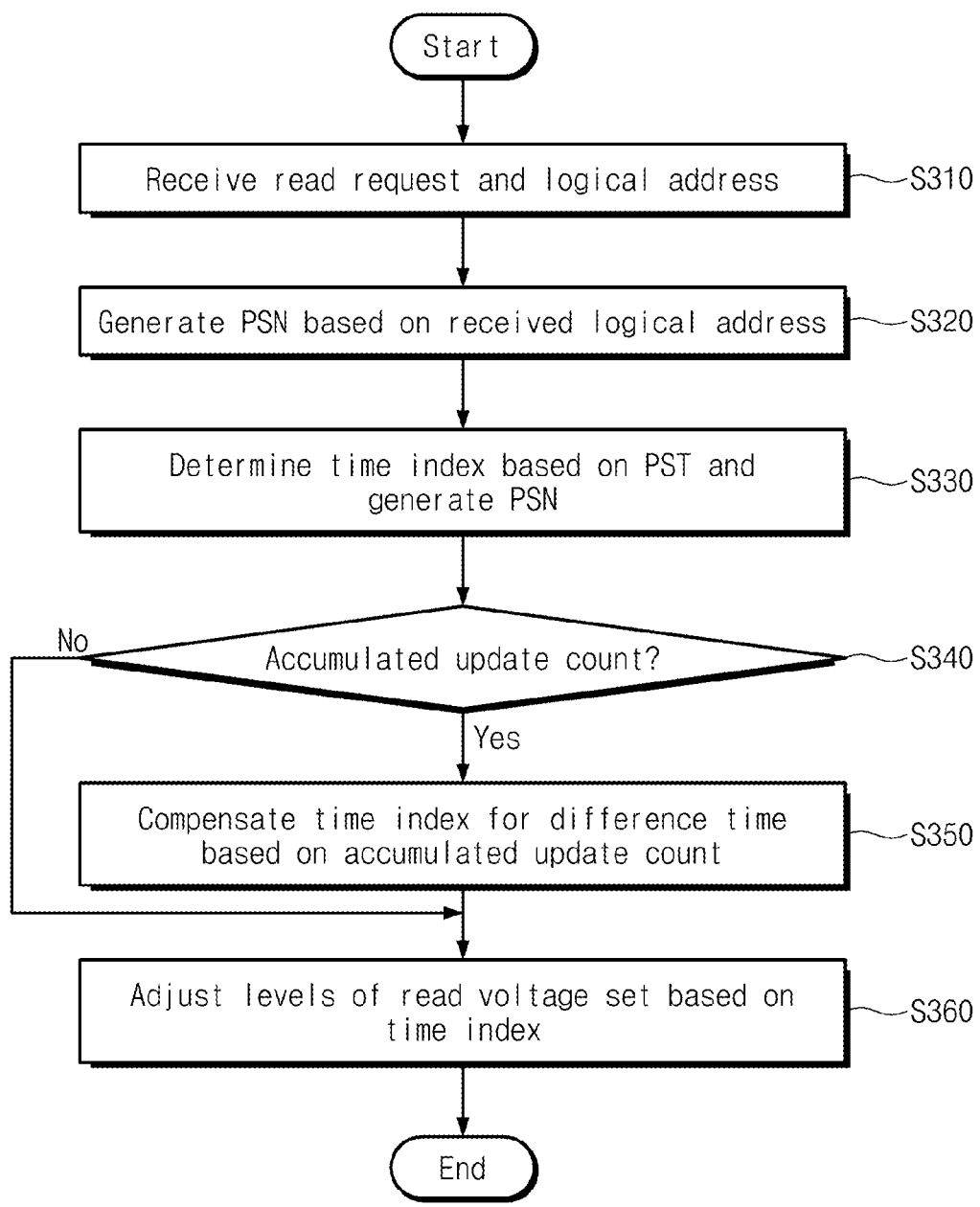
FIG. 17 is a flow chart schematically illustrating an operation of a memory controller according to a further embodiment of the application.

FIG. 17 is a flow chart schematically illustrating an operation of a memory controller according to a further embodiment of the application. A read operation of a memory controller 110 will be more fully described with reference to FIG. 17.

Referring to FIGS. 1 and 17, in step S310, the memory controller 110 receives a read request and a logical address from an external device.

In step S320, the memory controller 110 generates a page serial number PSN corresponding to the received logical address. For example, FTL 113 (refer to FIG. 2) included in the memory controller 110 converts the received logical address into a physical address. The converted physical address may be an address indicating at least one of a plurality of pages in a nonvolatile memory device 120. The memory controller 110 generates a page serial number PSN of a page corresponding to the converted physical address, as described with reference to FIG. 7.

Figure 19:
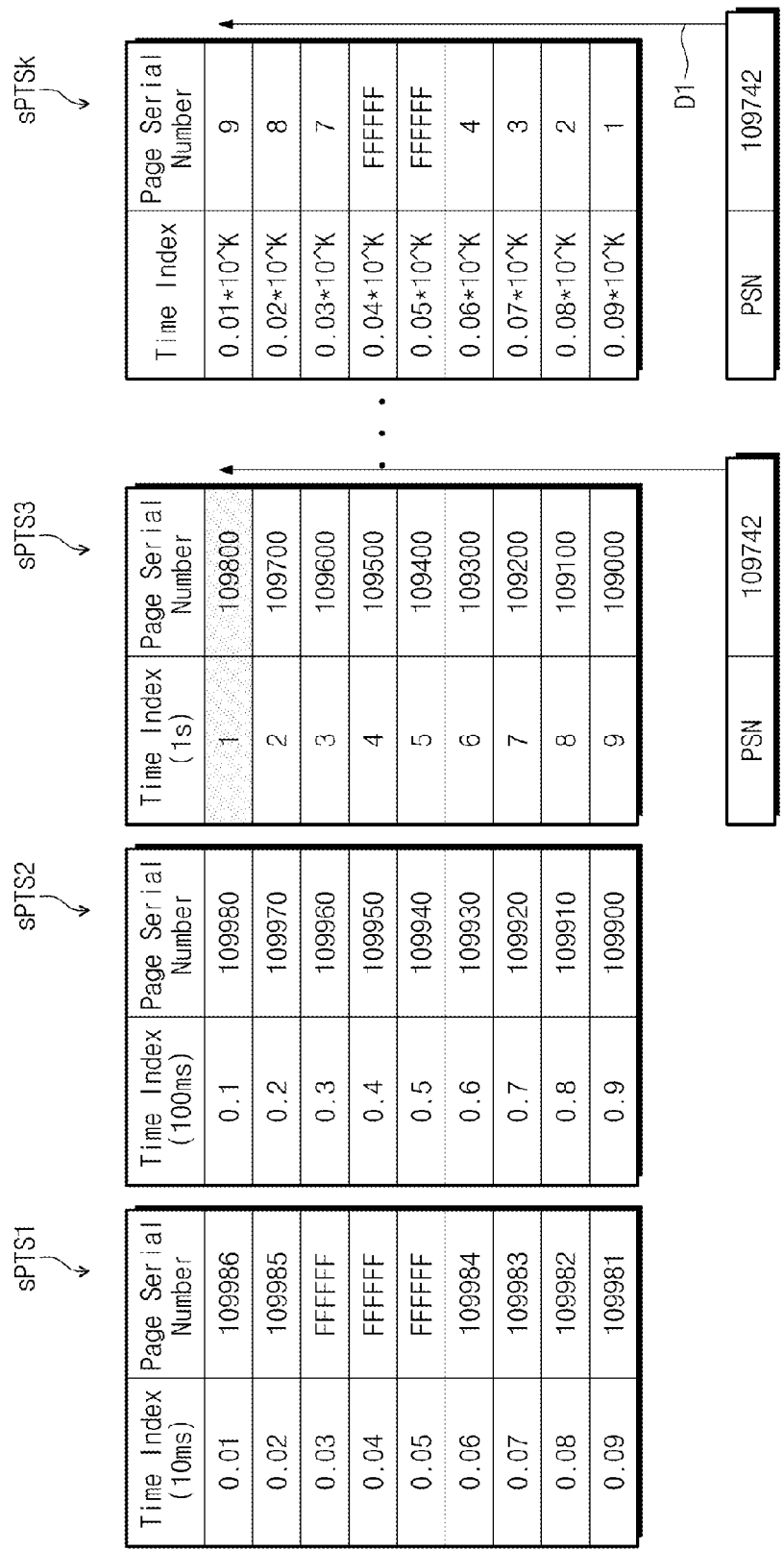
Figure 20:
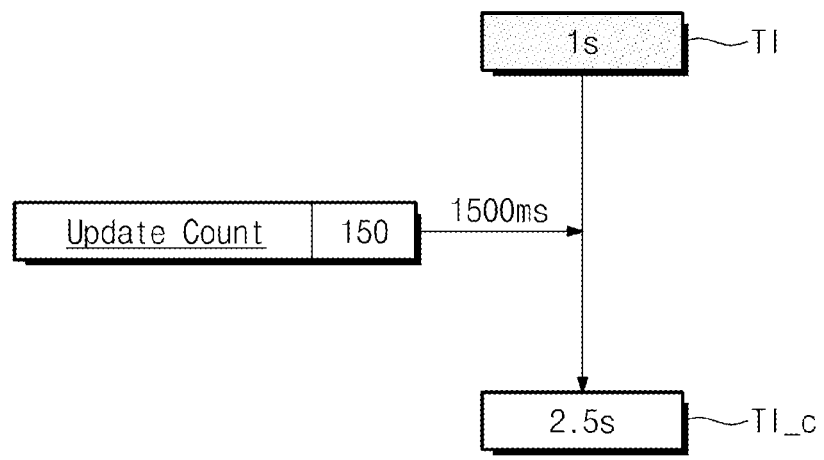

In step S330, the memory controller 110 determines a PTS time index, depending on the page serial number PSN and a program time stamp table PTS. For example, the memory controller compares the generated page serial number PSN with each of page serial numbers included in the program time stamp table PTS. The memory controller 110 determines a section in which the generated page serial number PSN is included. An operation corresponding to the step S330 will be more fully described with reference to FIG. 19.

In step S340, the memory controller 110 determines whether an accumulated update count exists. For example, as described with reference to FIGS. 1 to 16, the nonvolatile memory device 120 does not perform a program operation during a predetermined time. In this case, the memory controller 110 periodically updates or accumulates the update count during a predetermined time. That is, that an update count is updated or accumulated by the memory controller 110 means that the program time stamp table PTS is not updated as long as a time corresponding to the accumulated update count. In other words, if an update count is updated or accumulated by the memory controller 110, a time corresponding to the accumulated update count means a time when the program time stamp table PTS is not updated.

As a consequence of determining that the accumulated update count exists, in step S350, the memory controller 110 compensates a time index for a time difference, depending on the accumulated update count. In exemplary embodiments, the time difference indicates a time corresponding to the accumulated update count or a time when the program time stamp table PTS is not updated.

In step S360, the memory controller 110 adjusts levels of a read voltage set of the nonvolatile memory device 120, depending on the time index. For example, the memory controller 110 may adjust levels of the read voltage set, depending on a predefined table PDT and the time index.

As a consequence of determining that the accumulated update count does not exist, the method proceeds to the step S360, in which the memory controller 110 adjusts levels of a read voltage set for the nonvolatile memory device 120, depending on the time index.

With the above description, at a read operation, the memory controller 110 compensates a time index for a time difference indicating a program elapsed time, depending on an accumulated update time. Thus, there are provided a memory controller with improved reliability and an operating method thereof.

Figure 18:
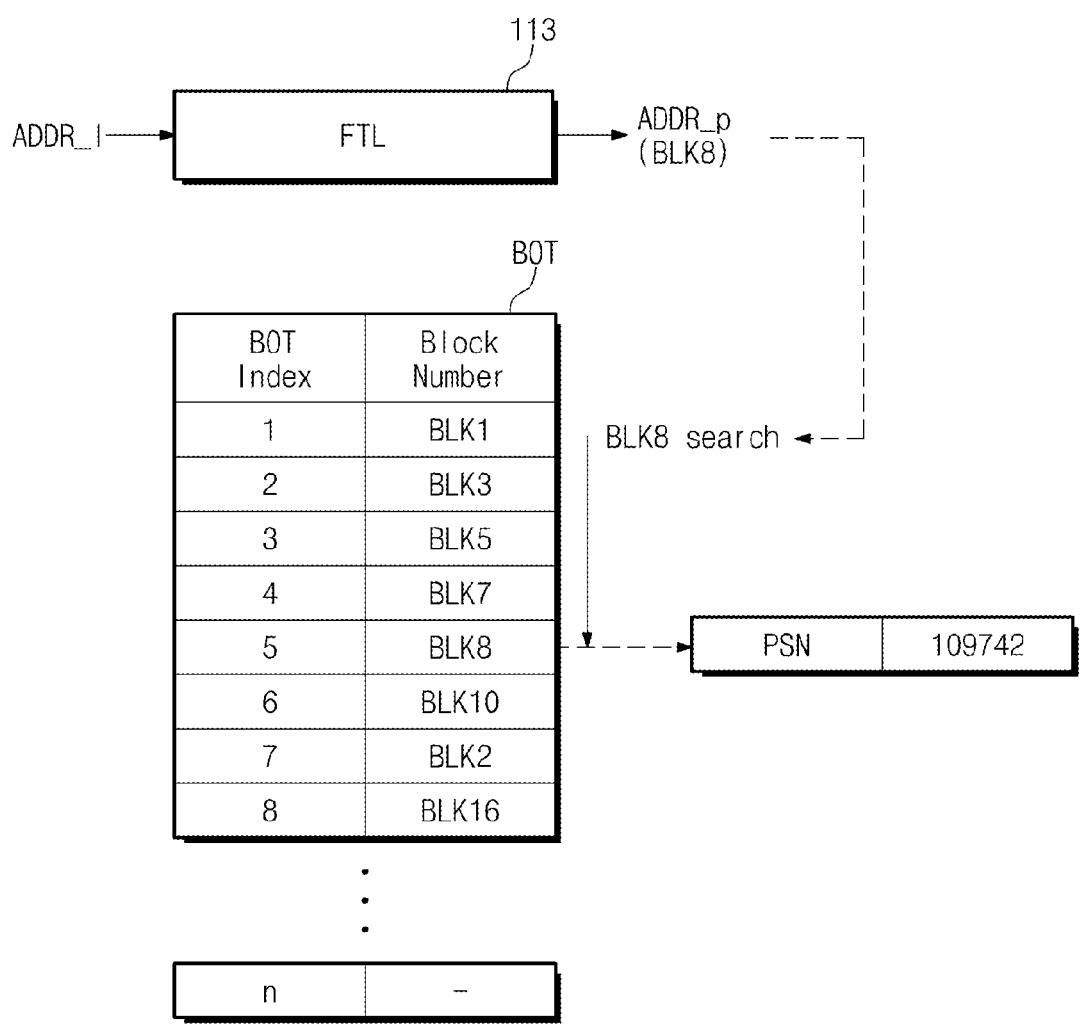

FIGS. 18 to 22 are diagrams for describing an operating method shown in FIG. 17. Referring to FIGS. 1, 17, and 18, a memory controller 110 receives a logical address ADDR_l from an external device and converts it into a physical address ADDR_p. For example, FTL 113 included in the memory controller 110 converts the received logical address ADDR_l into a physical address ADDR_p.

The physical address ADDR_p thus converted contains a physical block number and a physical page number PPN. For the sake of easy understanding, it is assumed that a physical address ADDR_p includes a physical block number PBN of an eighth memory block BLK8. However, the application is not limited thereto.

The memory controller 110 searches a block order table BOT, depending on the converted physical address ADDR_p. For example, the converted physical address ADDR_p includes a physical block number PBN of an eighth memory block BLK8, the memory controller 110 searches a BOT index corresponding to the eighth memory block BLK8, depending on the block order table BOT. For example, as illustrated in FIG. 18, a BOT index value corresponding to the eighth memory block BLK8 may be '5'. This means that the eighth memory block BLK8 is a block fifthly allocated.

The memory controller 110 creates a page serial number PSN, depending on the searched BOT index and the physical address ADDR_p. For example, the memory controller 110 generates a page serial number PSN according to the following equation (1).

$$PSN = \alpha X + \beta \quad (1)$$

Referring to the equation (1), 'PSN' denotes a page serial number, 'X' denotes a BOT index, 'α' denotes a constant value, and 'β' denotes a page offset. The constant value (α) may be decided according to the number of pages included in one memory block or according to the number of loops of the block order table BOT. For example, assuming that one loop ends when all entries of the block order table BOT are written with corresponding physical block numbers, the number of loops of the block order table BOT denotes how many times the loop is repeated. The page offset (β) indicates a location of a page in a memory block. That is, the page offset (β) may be decided according to a physical page number PPN included in the physical address ADDR_p. For example, a page serial number PSN corresponding to the physical address ADDR_p thus converted may be '109742'.

The memory controller 110 generates a page serial number PSN of a page corresponding to an input logical address ADDR_l, depending on a method described with reference to FIG. 18.

In exemplary embodiments, an operating method of the memory controller 110 described with reference to FIG. 18 may be executed using its hardware or software layer. For example, an operating method of the memory controller 110 described with reference to FIG. 12 may be executed by FTL 113 of the memory controller 110 or by CPU 114 driving the FTL 113. Alternatively, the memory controller 110 may separately include hardware to execute an operating method described with reference to FIG. 18. For example, an operation described with reference to FIG. 18 may be an operation corresponding to step S320 shown in FIG. 17.

Referring to FIGS. 1 and 17 to 19, the memory controller 110 compares the generated page serial number PSN of '109742' with each page serial number included in a program time stamp table PTS. For example, the memory controller 110 compares the page serial number PSN of '109742' with each page serial number included in a k-th sub table sPTSk along an order of a first direction D1. More specifically, the memory controller 110 sequentially compares the page serial number PSN of '109742' with page serial numbers in the program time stamp table PTS and detects a section where a change in a comparison result occurs. For example, referring to page serial numbers of '109742', '109800', and '109700', the memory controller 110 identifies a time index corresponding to the page serial number PSN of '109742' thus generated as '1'. In exemplary embodiments, the above-described operation may be an operation corresponding to the step S330 shown in FIG. 17.

Stated another way, with respect to the example described above, the memory controller 110 compares the page serial number PSN of '109742' with each page serial number included in each k-th sub table sPTSk along an order of a first direction D1 until a result of the comparison changes from a result of greater than to a result of equal to or less than. The time index corresponding to the PTS-stored page serial number for which the comparison result changes in this way is selected as the time index corresponding to the page serial number of '109742.' In this example, the comparison result changes between the stored PTS page serial numbers of '109700' and '10980' within sPTS3. Thus, the stored PTS page serial numbers of '109700' is identified as corresponding to the page serial number PSN of '109700' and the stored time index for page serial numbers of '109700' is selected as that also corresponding to the page serial number PSN of '109742.'

Afterwards, the memory controller 110 determines whether an accumulated update count exists. For example, suppose the nonvolatile memory device 120 has not performed a program operation during the 1500 milliseconds before a current read operation is performed. Further supposing the program time stamp table PTS is updated every 10 milliseconds, the update count accumulated by the memory controller 110 would be '150'. In other words, the accumulated update count being '150' denotes that 1500 milliseconds has elapsed from a point in time when the program time stamp table PTS was updated.

Referring to FIGS. 1 and 17 to 20, the memory controller 110 compensates a time index TI for a time difference detected on the basis of the accumulated update count. Herein, the time difference may denote an elapsed time from a point in time when the program time stamp table PTS is updated. As described above, if the accumulated update count is '150', the memory controller 110 adds 1500 milliseconds (i.e., 1.5 seconds) to the detected time index TI to compensate for the time difference. For example, a compensated time index TI_c may be 2.5 seconds when the detected time index TI is 1 second (i.e., 1500 milliseconds+1 second=2.5 seconds).

Referring to FIGS. 1 and 17 to 22, the memory controller 110 adjusts levels of a read voltage that are set, depending on the compensated time index TI_c (i.e., 2.5 seconds) and a predefined table PDT.

Figure 21:
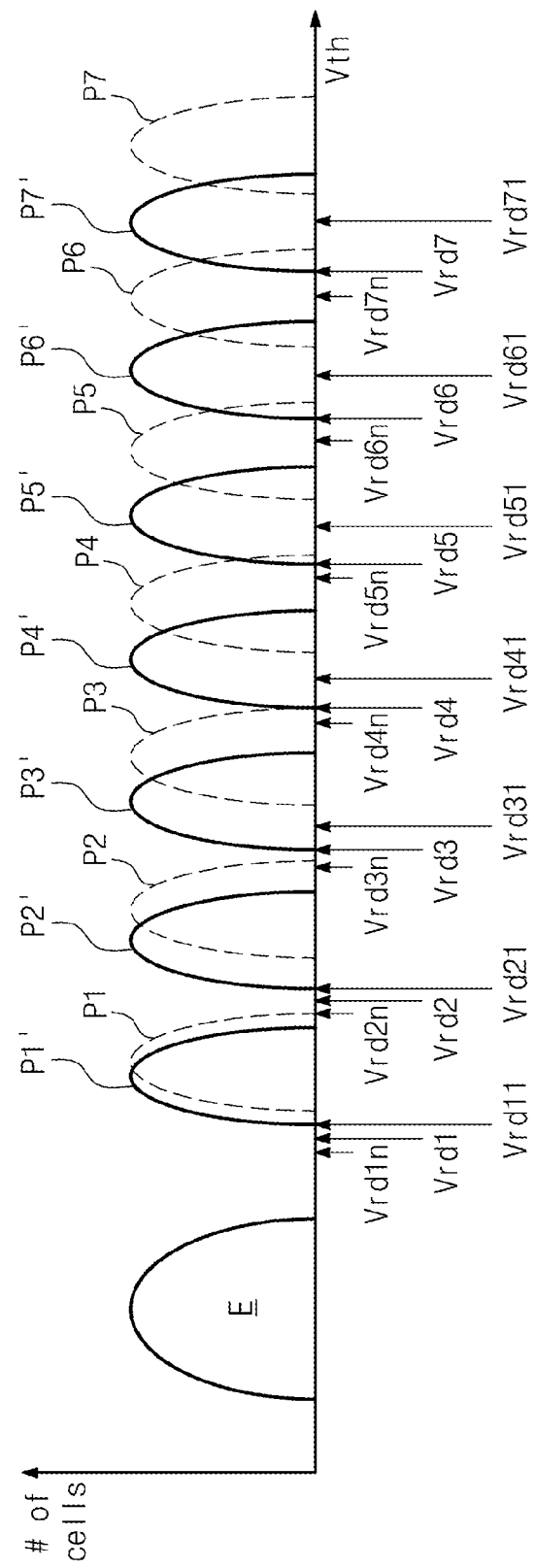

As illustrated in FIG. 21, threshold voltages of memory cells of the nonvolatile memory device 120 vary with the lapse of time after being programmed. For example, the nonvolatile memory device 120 programs memory cells to one of an erase state E and first to seventh program states P1 to P7. When each of the memory cells has one of the erase state E and the first to seventh program states P1 to P7, the nonvolatile memory device 120 determines program states of the memory cells using read voltages Vrd11 through Vrd71.

However, each of the memory cells has one of the erase state E and program states P1' to P7' as time elapses. That is, it is impossible to read normal data (or, data including a correctable error) when the nonvolatile memory device 120 performs a read operation using the read voltages Vrd11 through Vrd71.

The memory controller 110 decides levels of read voltages of the nonvolatile memory device 120, depending on a compensated time index (e.g., 2.5 seconds). For example, the nonvolatile memory device 120 performs a read operation using first to seventh read voltages Vrd1 to Vrd7. The memory controller 110 adjusts levels of the first to seventh read voltages Vrd1 to Vrd7, depending on the compensated time index (e.g., 3.5 seconds). At this time, the first read voltage Vrd1 is between Vrd11 and Vrd1n, the second read voltage Vrd2 is between Vrd21 and Vrd2n. The third read voltage Vrd3 is between Vrd31 and Vrd3n. The fourth read voltage Vrd4 is between Vrd41 and Vrd1n. The fifth read voltage Vrd5 is between Vrd51 and Vrd5n. The sixth read voltage Vrd6 is between Vrd61 and Vrd1n. And, the seventh read voltage Vrd7 is between Vrd71 and Vrd1n.

In exemplary embodiments, the memory controller 110 determines a read-voltage set of the nonvolatile memory device 120 according to a compensated time index. For example, as illustrated in FIG. 22, the predetermined PDT may include information on read-voltage sets corresponding to elapsed times. For example, the elapsed time may denote a compensated time index.

The memory controller 110 determines a read-voltage set corresponding to a compensated time index, depending on the predefined table PDT. When the compensated time index is 2.5 seconds, the memory controller 110 selects a read-voltage set V12 through V72 (i.e., a read voltage set corresponded to a first PDT index IND1). Under a control of the memory controller 110, the nonvolatile memory device 120 performs a read operation, based on the selected read voltage set V12 through V17.

In accordance with a further embodiment of the application, at a read operation, the memory controller 110 detects a program elapsed time of a page to be read, depending on a page serial number PSN of the page to be read and a program time stamp table PTS. At this time, the memory controller 110 compensates a program elapsed time for a time difference, depending on an accumulated update count. The time difference may denote a time during which the program time stamp table PTS is not updated. Thus, there is provided a memory controller with improved reliability and an operating method thereof.

Figure 23:
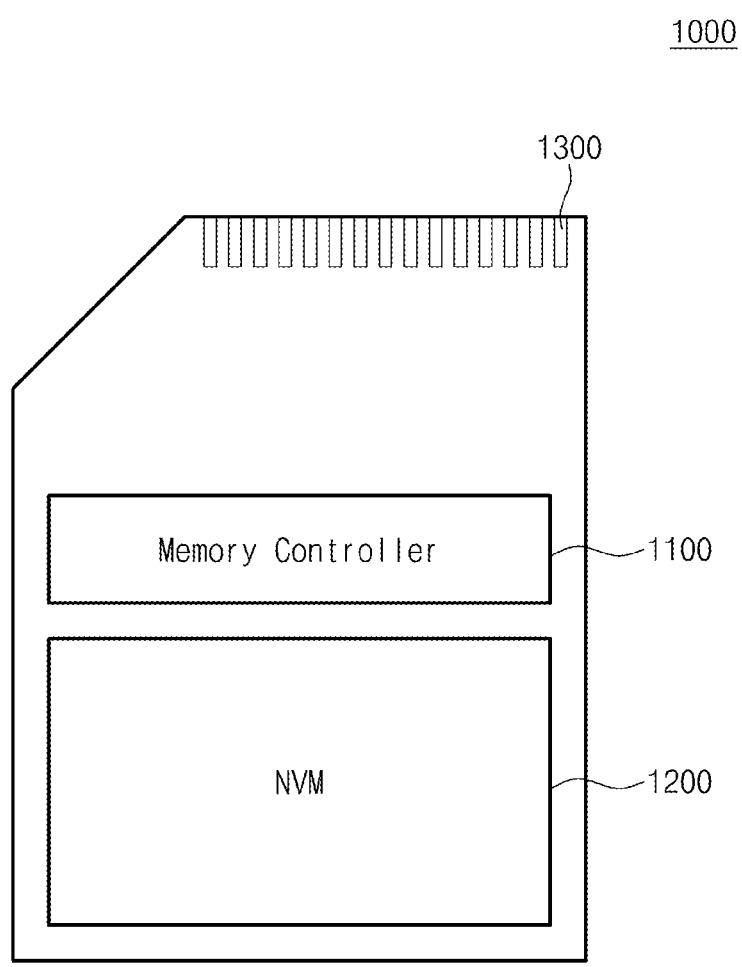
FIG. 23 is a block diagram schematically illustrating a memory card system including a nonvolatile memory system according to embodiments of the application.

FIG. 23 is a block diagram schematically illustrating a memory card system including a nonvolatile memory system according to embodiments of the application. Referring to FIG. 23, a memory card system 1000 contains a memory controller 1100, a nonvolatile memory 1200, and a connector 1300.

The memory controller 1100 is connected to the nonvolatile memory 1200. The memory controller 1100 is configured to access the nonvolatile memory 1200. For example, the memory controller 1100 may be adapted to control an overall operation of the nonvolatile memory 1200 including, but not limited to, a read operation, a write operation, an erase operation, and a background operation. The memory controller 1100 provides an interface between the nonvolatile memory 1200 and a host. The memory controller 1100 is configured to drive firmware for controlling the nonvolatile memory 1200.

In exemplary embodiments, the memory controller 1100 may include components such as, but not limited to, a RAM, a processing unit, a host interface, a memory interface, and an error correction unit.

The memory controller 1100 communicates with an external device according to a particular communication protocol. For example, the memory controller 1100 may communicate with the external device through at least one of various interface protocols such as, but not limited to, a universal serial bus (USB) protocol, a multimedia card (MMC) protocol, a Peripheral Component Interconnection (PCI) protocol, a PCI-Express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and a Firewire protocol.

In exemplary embodiments, the memory controller 1100 may be a memory controller described with reference to FIGS. 1 to 22. The nonvolatile memory 1200 may be implemented with a variety of nonvolatile memory devices, such as, but not limited to, an EPROM (Electrically Erasable and Programmable ROM), a NAND flash memory, a NOR flash memory, a PRAM (Phase-change RAM), an ReRAM (Resistive RAM), a FRAM (Ferroelectric RAM), and an STT-MRAM (Spin-Torque Magnetic RAM).

In exemplary embodiments, the memory controller 1100 and the nonvolatile memory 1200 may be integrated in a single semiconductor device. The memory controller 1100 and the nonvolatile memory 1200 may be integrated in a single semiconductor device to form a solid state drive (SSD). The memory controller 1100 and the nonvolatile memory 1200 may be integrated in a single semiconductor device to form a memory card such as, but not limited to, a PC card (PCMCIA, personal computer memory card international association), a compact flash card (CF), a smart media card (SM, SMC), a memory stick, a multimedia card (MMC, RS-MMC, MMCmicro), an SD card (SD, miniSD, microSD, SDHC), and a universal flash storage (UFS).

The nonvolatile memory 1200 or the memory card system 1000 according to the application may be packaged according to any of a variety of different packaging technologies. Examples of such packaging technologies may include Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flat-pack (TQFP), System In Package (SIP), Multi Chip Package (MCP), Wafer-level Fabricated Package (WFP), Wafer-Level Processed Stack Package (WSP), and so on.

Figure 24:
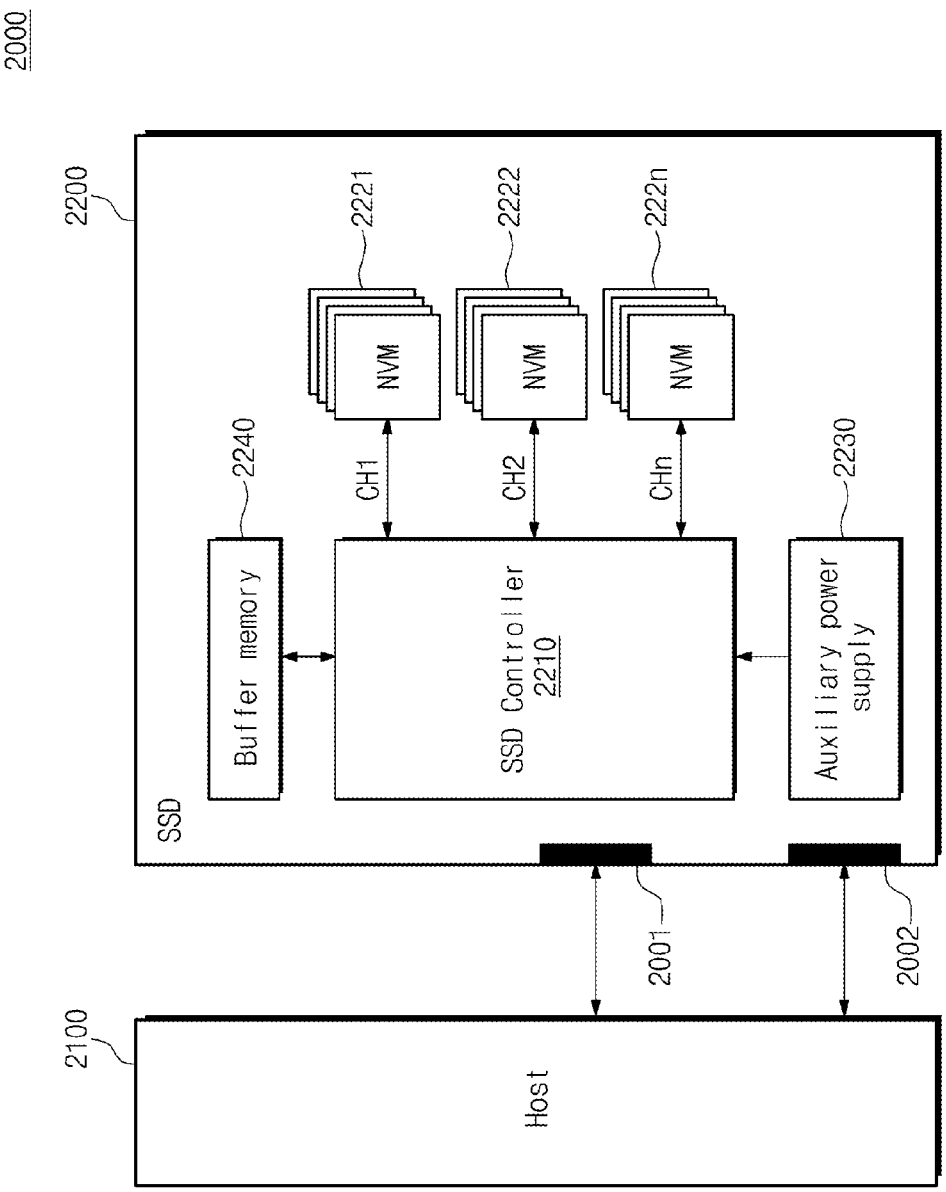
FIG. 24 is a block diagram illustrating a solid state drive including a nonvolatile memory system according to an embodiment of the application.

FIG. 24 is a block diagram illustrating a solid state drive including a nonvolatile memory system according to an embodiment of the application. Referring to FIG. 24, a solid state drive (SSD) system 2000 comprises a host 2100 and an SSD 2200. The SSD 2200 exchanges signals SGL with the host 2100 through the host interface 2001 and is supplied with a power through a power connector 2002. The SSD 2200 comprises a plurality of flash memories 2221 to 222n, an SSD controller 2210, an auxiliary power supply 2230, and a buffer memory 2240.

The SSD controller 2210 controls the flash memories 2221 to 222n in response to a signal SIG from the host 2100. For example, the SSD controller 2210 may be a memory controller described with reference to FIGS. 1 to 15.

The auxiliary power supply 2230 is connected to the host 2100 via the power connector 2002. The auxiliary power supply 2230 is charged by a power PWR from the host 2100. When power is not smoothly supplied from the host 2100, the auxiliary power supply 2230 powers the SSD system 2000. The auxiliary power supply 2230 may be placed inside or outside the SSD 2200. For example, the auxiliary power supply 2230 may be put on a main board to supply an auxiliary power to the SSD 2200.

The buffer memory 2240 acts as a buffer memory of the SSD 2200. For example, the buffer memory 2240 temporarily stores data received from the host 2100 or from the flash memories 2221 to 222n, or it temporarily stores metadata (e.g., mapping tables) of the flash memories 2221 to 222n. The buffer memory 2240 may include volatile memories such as DRAM, SDRAM, DDR SDRAM, LPDDR SDRAM, SRAM, and so on or nonvolatile memories such as FRAM ReRAM, STT-MRAM, PRAM, and so on.

In exemplary embodiments, an operation of the SSD controller 2210 may be based on an operating method described with reference to FIGS. 1 to 22.

Figure 25:
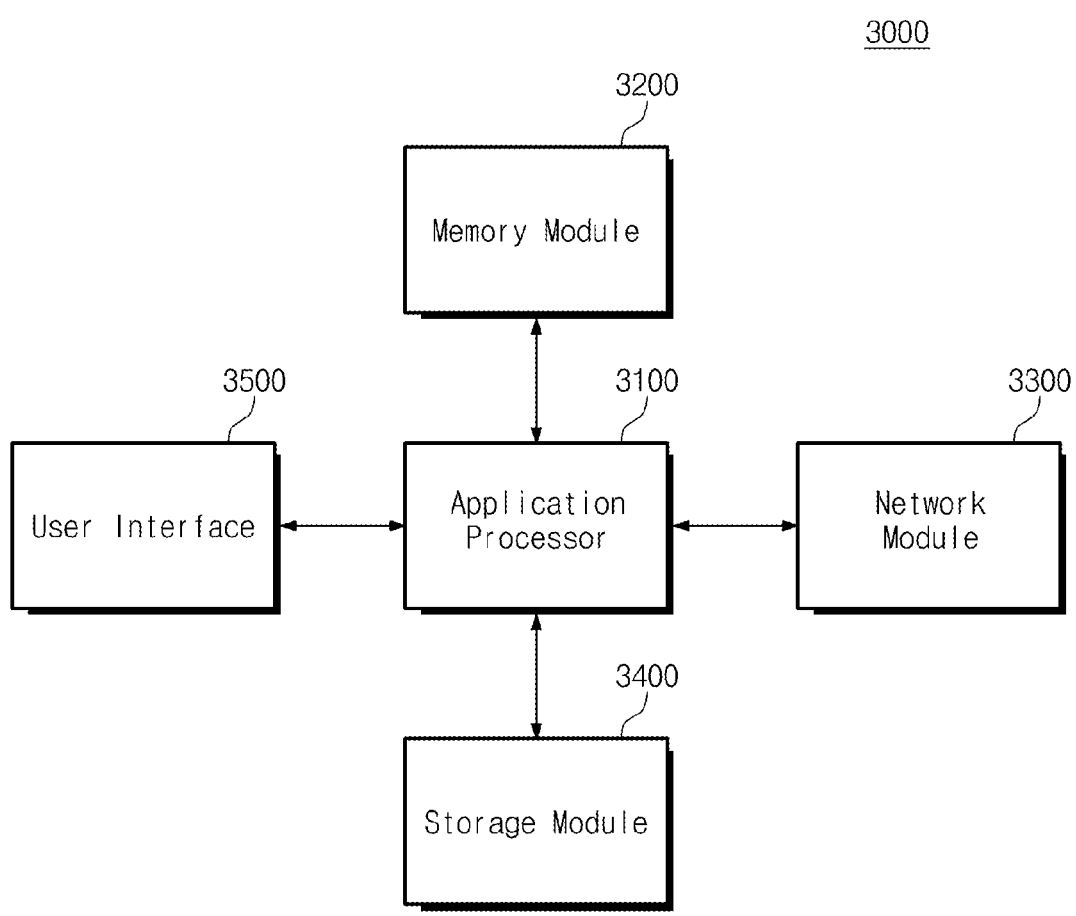
FIG. 25 is a block diagram schematically illustrating a user system including a nonvolatile memory system according to an embodiment of the application.

FIG. 25 is a block diagram schematically illustrating a user system including a nonvolatile memory system according to an embodiment of the application. Referring to FIG. 25, a user system 3000 includes an application processor 3100, a memory module 3200, a network module 3300, a storage module 3400, and an input interface 3500.

The application processor 3100 drives components of the user system 3000, an operating system, and so on. For example, the application processor 3100 may include controllers for controlling components of the user system 3000, graphics engines, a variety of interfaces, and so on. The application processor 3100 may be implemented with a system-on-chip (SoC).

The memory module 3200 operates as a main memory, a working memory, a buffer memory, or a cache memory of the user system 3000. The memory module 3200 may be implemented with a volatile random access memory, such as DRAM (Dynamic Random Access Memory), SDRAM (Synchronous DRAM), DDR SDRAM (Double Date Rate SDRAM), DDR2 SDRAM, DDR3 SDRAM, LPDDR DRAM, LPDDR2 DRAM, or LPDDR3 DRAM or a nonvolatile random access memory, such as PRAM (Phase-change RAM), MRAM (Magnetic RAM), RRAM (Resistive RAM), or FRAM (Ferroelectric RAM).

The network module 3300 communicates with external devices. For example, the network module 3300 may support wireless communications, such as CDMA (Code Division Multiple Access), GSM (Global System for Mobile communication), WCDMA (wideband CDMA), CDMA-2000, TDMA (Time Division Multiple Access), LTE (Long Term Evolution), Wimax, WLAN, UWB, Bluetooth, WI-DI, and so on. As another embodiment, the network module 3300 may be embedded in the application processor 3100.

The storage module 3400 stores data. For example, the storage module 3400 stores data received from an external device. Alternatively, the storage module 3400 provides the application processor 3100 with data stored therein. For example, the storage module 3400 may be implemented with a nonvolatile semiconductor memory device such as PRAM, MRAM, RRAM, NAND flash memory, NOR flash memory, or a three-dimensional NAND flash memory.

In exemplary embodiments, the storage module 3400 may be a nonvolatile memory system described with reference to FIGS. 1 to 22. The storage module 3400 may operate based on an operating method described with reference to FIGS. 1 to 22.

The input interface 3500 may provide interfaces for providing data or commands to the application processor 3100 or for outputting data to an external device. For example, the input interface 3500 may include user input interfaces, such as a key board, a key pad, a button, a touch panel, a touch screen, a touch pad, a touch ball, a camera, a microphone, a Gyroscope, a vibration sensor, a piezoelectric element, and so on. The input interface 3500 may include user output interfaces, such as an LCD (Liquid Crystal Display) device, an OLED (Organic Light Emitting Diode) display device, an AMOLED (Active Matrix OLED) display device, an LED, a speaker, a motor, and so on.

With embodiments of the application, a memory controller may manage a program elapsed time of each page, depending on a program time stamp table. If a nonvolatile memory device is performing a program operation, the memory controller may update the program time stamp table periodically. If a nonvolatile memory device does not perform a program operation, the memory controller may accumulate or update an update count periodically. Afterwards, when the nonvolatile memory device performs a program operation, the memory controller updates the program time stamp table, depending on the accumulated update count, thereby making it possible to reduce overhead due to updating of the program time stamp table. At a read operation, also, the memory controller may compensate a program elapsed time for a time difference, depending on the accumulated update count. Thus, there is provided a memory controller with improved reliability and an operating method thereof.

The above-disclosed subject matter is to be considered illustrative, and not restrictive, and the appended claims are intended to cover all such modifications, enhancements, and other embodiments, which fall within the true spirit and scope of the application. Thus, to the maximum extent allowed by law, the scope of the application is to be determined by the broadest permissible interpretation of the following claims and their equivalents, and shall not be restricted or limited by the foregoing detailed description.

What is claimed is:

1. An operating method of a storage device including a memory controller and a nonvolatile memory device, the method comprising:
   determining whether the nonvolatile memory device performs a program operation on at least one of a plurality of pages; and
   updating either one of a program time stamp table, managed with program elapsed times of the plurality of pages, and an update count of the program time stamp table, based on the determination result,
   wherein the updating either one of the program time stamp table and the update count comprises:
   updating the program time stamp table in response to determining that the nonvolatile memory device performs the program operation, and updating the update count in response to determining that the nonvolatile memory device does not perform the program operation,
   wherein the updating the program time stamp table comprises:
   updating the program time stamp table, in accordance with the update count; and
   resetting the update count.

2. The operating method of claim 1, wherein:
   the program time stamp table includes page serial numbers of some of the plurality of pages, depending on the program elapsed times, and
   the page serial numbers denote a program order of the plurality of pages.

3. The operating method of claim 1, wherein the determining is periodically performed.

4. The operating method of claim 1, wherein the updating comprises updating the program time stamp table periodically while the nonvolatile memory device performs the program operation.

5. The operating method of claim 1, wherein the updating comprises updating the update count periodically while the nonvolatile memory device does not perform the program operation.

6. The operating method of claim 1, wherein the updating the program time stamp table further comprises:
   if the update count does not exist, determining whether an elapsed time from a point in time when the program time stamp table is updated is over a reference time; and
   updating the program time stamp table when the elapsed time from the point in time when the program time stamp table is updated is over the reference time.

7. The operating method of claim 1, wherein the updating comprises:
   as a consequence of determining that the nonvolatile memory device does not perform the program operation, determining whether an elapsed time from a point in time when the program time stamp table is updated is over a reference time; and
   updating the update count when the elapsed time from the point in time when the program time stamp table is updated is over the reference time.

8. The operating method of claim 1, wherein the updating comprises updating the program time stamp table with the update count when the update count is over a threshold value.

9. The operating method of claim 1, further comprising:
   receiving a read request and a logical address from an external device;
   generating a page serial number of a page corresponding to the received logical address;
   detecting a program elapsed time of the page corresponding to the received logical address, depending on the page serial number thus generated and the program time stamp table; and
   adjusting levels of read voltages of the nonvolatile memory device, depending on the program elapsed time thus detected.

10. The operating method of claim 9, wherein the detecting comprises:
    determining whether the update count exists; and
    as a consequence of determining that the update count exists, compensating the program elapsed time for a time difference with the update count.

11. A nonvolatile memory system comprising:
    a nonvolatile memory device including a plurality of pages; and
    a memory controller configured to manage page serial numbers of some of the plurality of pages in the form of a program time stamp table, depending on program elapsed times of the plurality of pages, wherein
    the memory controller is configured to:
    determine whether the nonvolatile memory device performs a program operation on at least one of the plurality of pages, and
    update the program time stamp table in response to determining that the nonvolatile memory device performs the program operation, and update an update count of the program time stamp in response to determining that the nonvolatile memory device does not perform the program operation,
    wherein the memory controller is configured to update the program time stamp table, in accordance with the update count and reset the update count.

12. The nonvolatile memory system of claim 11, wherein:
    the program time stamp table is managed in logarithmic scale, and
    the program time stamp table comprises a plurality of sub tables of which the update periods are different from each other.

* * * * *